United States Patent [19]

Shiroshita et al.

[11] Patent Number: 4,712,183
[45] Date of Patent: Dec. 8, 1987

[54] TRACKING ROBOT APPARATUS

[75] Inventors: Osamu Shiroshita; Yasuo Ishiguro; Yoshizumi Itou, all of Aichi, Japan

[73] Assignees: Kabushiki Kaisha Toyota Chuo Kenkyusho; Toyota Jidosha Kabushiki Kaisha, both of Tokyo, Japan

[21] Appl. No.: 763,127

[22] Filed: Aug. 6, 1985

[30] Foreign Application Priority Data

Aug. 6, 1984 [JP] Japan .............................. 59-163804

[51] Int. Cl.$^4$ ...................... G06F 15/46; G05B 19/42
[52] U.S. Cl. .................................. 364/513; 364/191; 901/3; 901/6; 901/8
[58] Field of Search ....................... 364/513, 191–193; 901/6–8, 2, 3; 414/730; 318/568

[56] References Cited

U.S. PATENT DOCUMENTS

| 3,890,552 | 6/1975 | Devol ................................. 901/8 X |
| 4,011,437 | 3/1977 | Hohn ................................. 901/7 X |
| 4,086,522 | 4/1978 | Engelberger et al. ............. 901/7 X |
| 4,348,623 | 9/1982 | Kobayashi et al. ................ 901/6 X |
| 4,495,588 | 1/1985 | Nio et al. ............................ 364/513 |
| 4,541,770 | 9/9185 | Niinomi et al. ..................... 901/8 X |

Primary Examiner—Joseph Ruggiero

[57] ABSTRACT

A tracking robot apparatus has a robot for performing a predetermined operation, a movable device for moving an object of interest, a signal input device for designating operations of the robot and the movable device, an operation device for calculating an operation instruction value of the movable device in response to an input signal from the signal input device, a controller for driving the movable device in accordance with the calculated operation instruction value, an operation device for calculating a position/posture instruction value to keep relative position and posture of the robot and the movable device unchanged upon operation of the movable device, and a controller for driving a robot in accordance with the calculated position/posture instruction value. The movable device is operated in response to the signal from the signal input device, and at the same time the robot is operated such that the relative position and posture of the robot and the movable device are kept unchanged.

22 Claims, 16 Drawing Figures (1)

(2) (3)

(1)

(2)          (3)

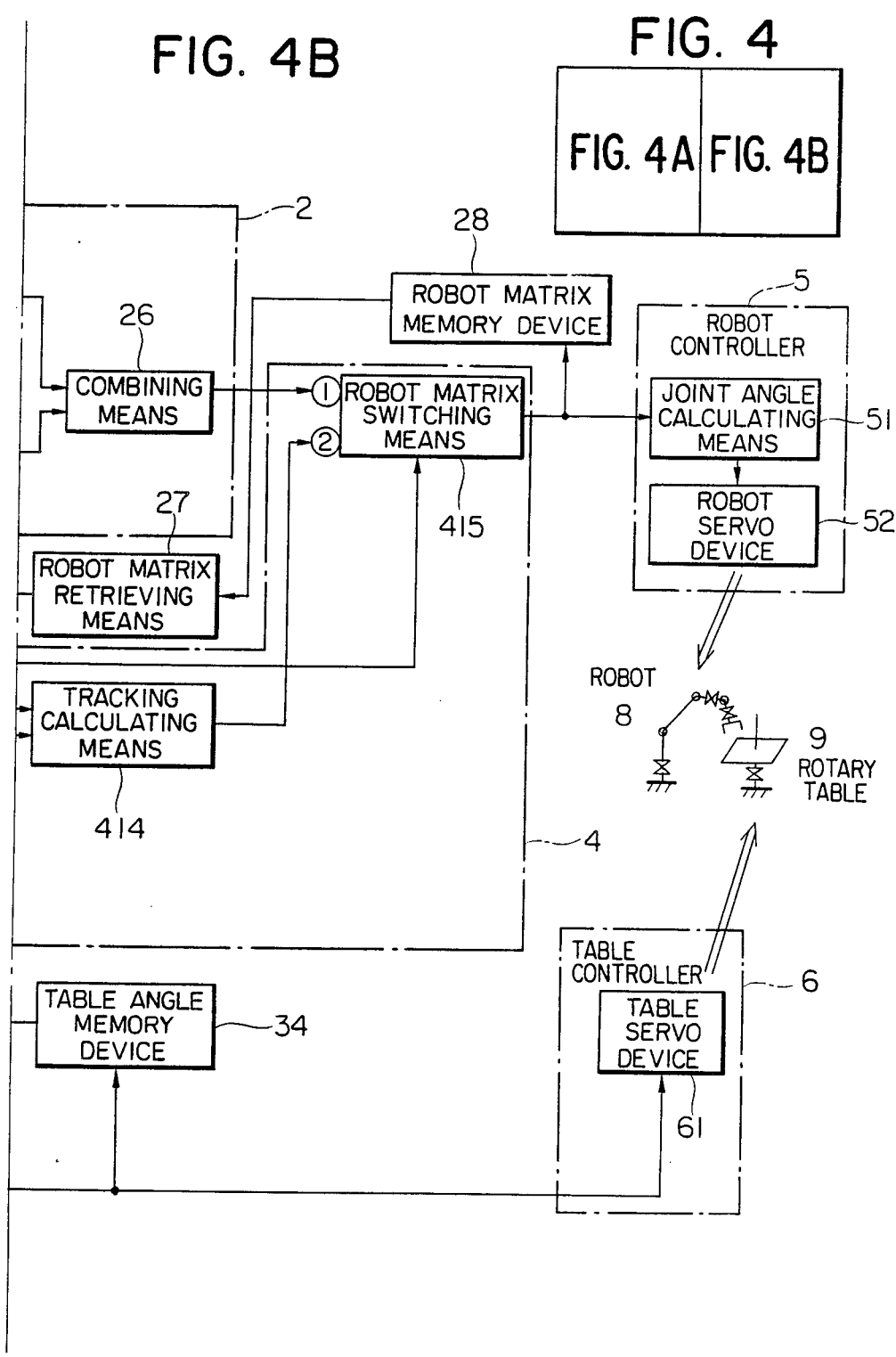

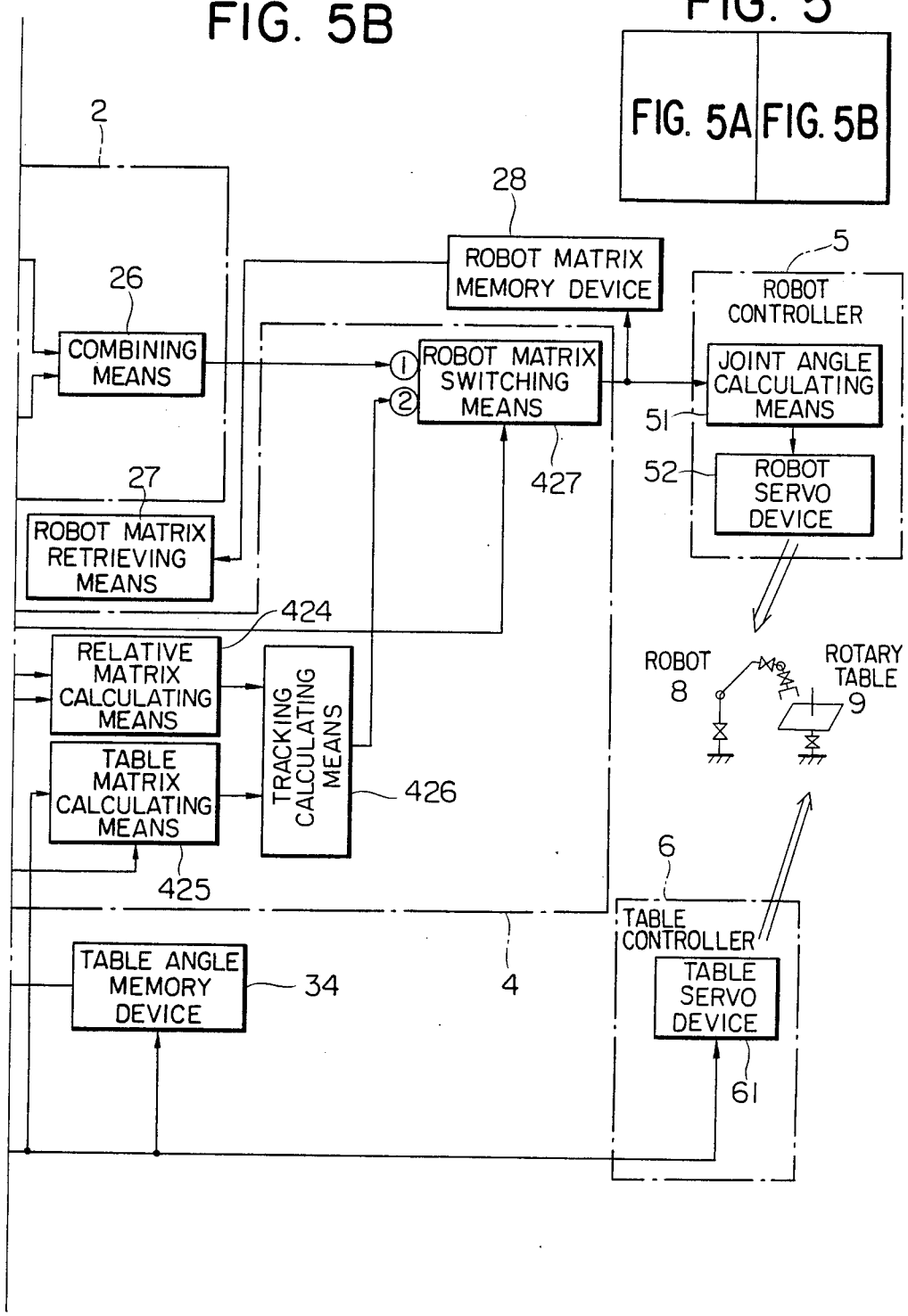

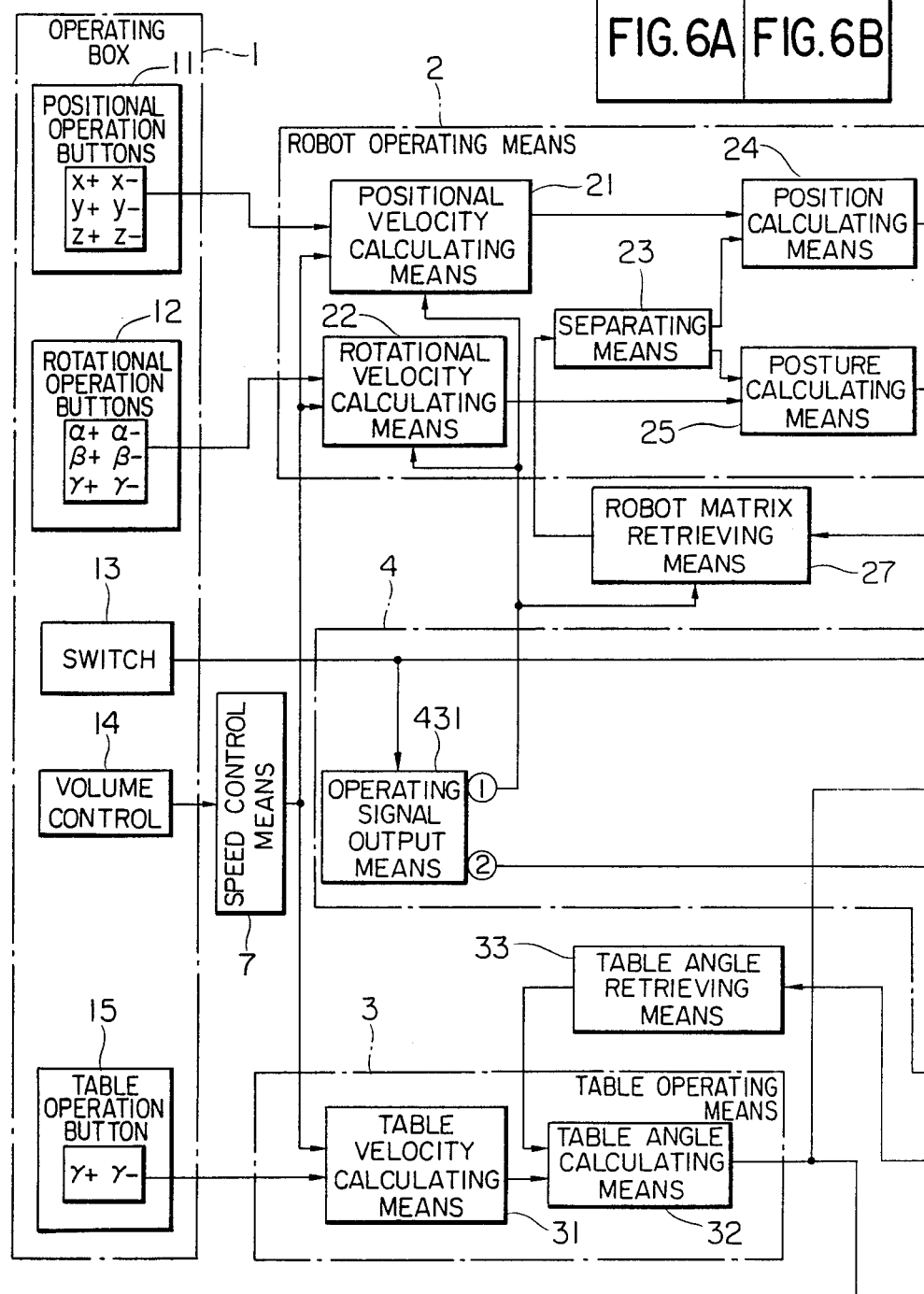

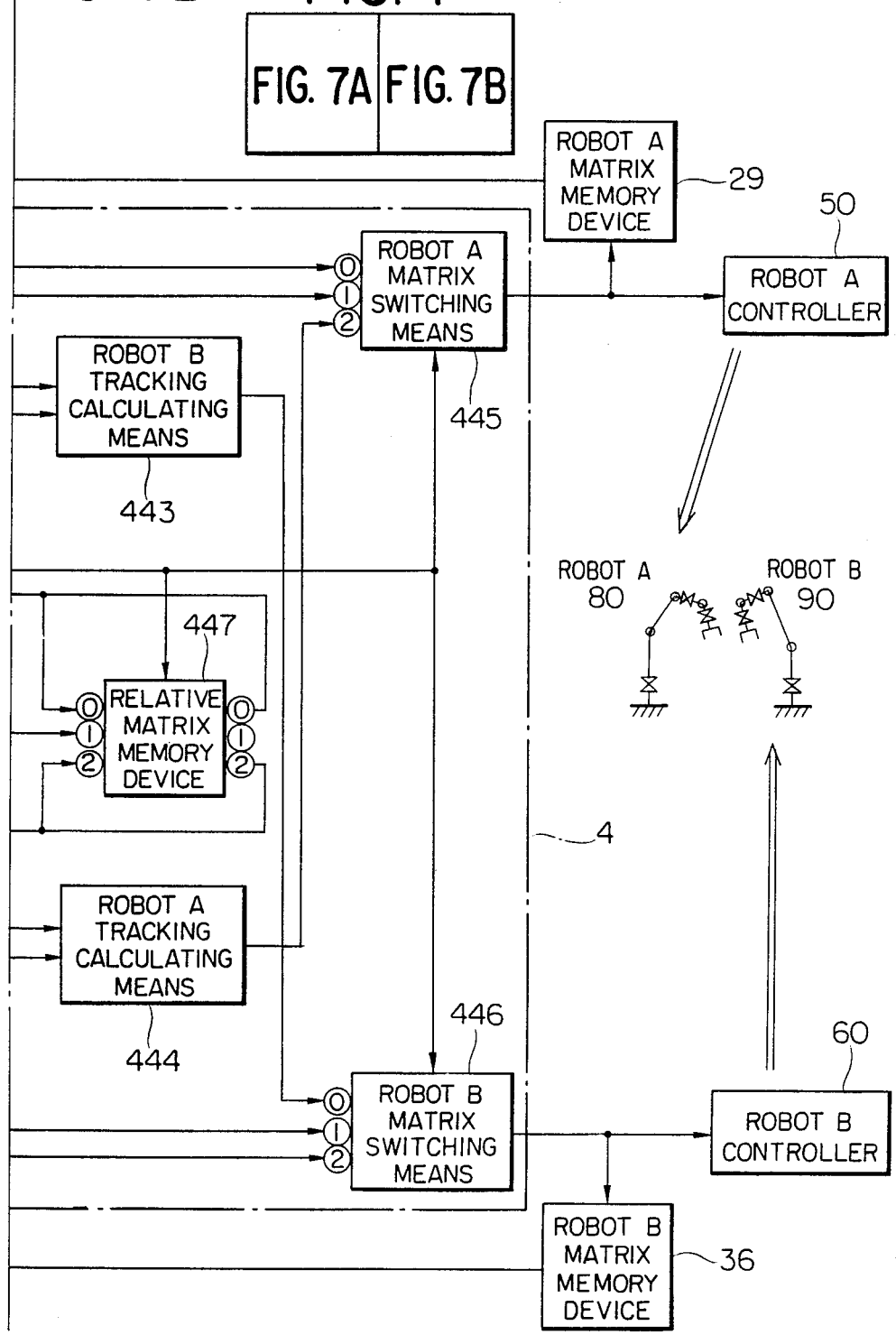

TRACKING ROBOT APPARATUS

FIELD OF THE INVENTION AND RELATED ART STATEMENT:

The present invention relates to a tracking robot apparatus for constantly maintaining unchanged relative position/posture between a robot and a workpiece fixed on a movable device in a system having the movable device and the robot.

Conventional robot operations are limited within a movable range of a robot. In order for the robot to operate on a workpiece which extends beyond the movable range of the robot, the operation of the robot is temporarily stopped before the robot exceeds its movable range. The stopped robot is then moved away from the wordpiece, the workpiece is moved into a position where further robot operation is possible, and the operation is restarted. For this reason, the following problems occur:

(1) Dam adhesion cannot be performed for vehicle window glass adhesion preparation since a tape is adhered to a workpiece and such operation cannot be interrupted.

(2) When the operation is interrupted and the robot is moved away from the workpiece, the operation time is prolonged.

In a conventional teaching system for performing an operation in synchronism with a robot and a movable device after a workpiece is mounted on the movable there are provided a means for driving only the robot and a means for driving only the movable device. For this reason, when the movable device is operated, the relative position/posture between the robot and the workpiece fixed on the movable device are changed, resulting in inconvenience. When a continuous operation is to be taught, the position and posture of the robot must often be maintained from one operating point to the next operating point. For this reason, the movable device is moved and then oriented such that the immediately preceding relative position/posture between the robot and the work on the movable device are restored. Thereafter, the next operating point must be taught.

FIG. 1 is an explanatory diagram for explaining conventional teaching procedures of continuous teaching points $P_1$, $P_2$ and $P_3$ in a system having a rotary device and a robot so as to compare the conventional system with a system of the present invention.

In the conventional system having the rotary table and the robot, a means for rotating the rotary table and a means for operating the robot can be used. The teaching procedures are performed as follows:

(1) Since the robot is located in the point $P_1$, the point $P_1$ is stored as a teaching point.

(1)→(2) The robot is moved by the robot operating means to the point $P_2$.

(2) Since the robot is now located in the point $P_2$, this point is stored as a teaching point.

(2)→(3) The rotary table is rotated by the rotary table rotating means.

(3) Since the rotary table is rotated, the robot is not located at the point $P_2$.

(3)→(4) The robot is returned by the robot operating means to the point $P_2$.

(4)→(5) The robot is moved by the robot operating means to the point $P_3$.

(5) Since the robot is located at the point $P_3$, this point is stored as a teaching point.

According to the conventional teaching procedures, the operation (3)→(4) is required. It is difficult to restore the state (2) from the state (4) of the robot, resulting in degradation of positioning/posturing precision.

In this manner, since the operation (3)→(4) is performed, (3) The operation time is prolonged due to this teaching procedure.

(4) Since it is difficult to restore the relative position and posture of the immediately preceding state, reproducibility during continuous operation is degraded.

SUMMARY OF THE INVENTION

It is an object of the present invention to provide a tracking robot apparatus wherein the conventional problems described above can be resolved, and a movable device and a robot can be simultaneously operated even if a position of a workpiece fixed on the movable device falls outside the movable range of the robot, thereby maintaining the workpiece within the movable range of the robot while the relative position/posture between the robot and the workpiece on the movable device are kept unchanged.

It is another object of the present invention to provide a tracking robot apparatus, wherein the conventional problems described above can be resolved and when teaching, the robot need not to be moved after the movable device is moved such that relative position/posture between the robot and the movable device are restored to the immediately preceding state.

According to the present invention, the robot need not be moved away from the workpiece while the robot holds a continuous tape or the like, thereby shortening the operating time.

Even if the robot has a narrow movable range, the movable device is added to the tracking robot apparatus to cause the robot to continue operation for a larger workpiece.

In order to achieve the above object of the present invention, there is provided a tracking robot apparatus, comprising; a robot for performing a predetermined operation; a movable device for moving a workpiece; a signal input device for instructing operations of the robot and the movable device; first operating means for calculating an operation instruction value of the movable device in accordance with an input signal from the signal input device; a first control device for driving the movable device in accordance with the operation instruction value; second operating means for calculating as an operation instruction value of the robot a position/posture instruction value for maintaining relative position/posture between the robot and the movable device in accordance with an operation of the movable device; and a second control device for driving the robot in accordance with the position/posture instruction value, the movable device being operated in accordance with the input signal from the signal input device, and at the same time the robot being operated such that the relative position/posture between the robot and the movable device are kept unchanged.

The tracking robot apparatus having the arrangement described above according to the present invention has an advantage as a coordinated operation apparatus in the playback mode. When the operation data of the movable device are sequentially entered at the signal input device while the workpiece is held by the movable device and the robot, the movable device is operated, and at the same time, the robot is operated in correspondence with the operation of the movable device, thereby maintaining the relative position/posture between the movable device and the robot to be constant. When a portion of the workpiece falls outside the movable range of the robot, the portion can be moved within the area of the movable range while the relative position/posture between the workpiece and the robot are kept unchanged. The tracking robot apparatus according to the present invention is suitable for an accurate operation free from tracking and positional errors. Uniform operation can be performed with high precision.

With the arrangement according to the present invention, since the robot need not be moved away from the workpiece, the operating time can be shortened. Even if the robot has a narrow operation range, it can be used for a larger workpiece.

The tracking robot apparatus can be operated while the workpiece is held by the robot and the movable device. A large or heavy workpiece which cannot be held only by the robot can be moved together with the movable device, thereby improving the utilization value of the robot. The teaching procedures of the tracking robot apparatus according to the present invention will be described with reference to FIG. 1 as follows:

(1) Since the robot is located at the point $P_1$, this point is stored as a teaching point.

(1)→(2) The robot is moved by the robot operating means to the point $P_2$.

(2) Since the robot is located at the point $P_2$, this point is stored as a teaching point.

(2)→(4) The robot is operated by a tracking means together with the rotary table.

(4) The robot is located at the point $P_2$.

(4)→(5) The robot is moved by the robot operating means to the point $P_3$.

(5) Since the robot is located at the point $P_3$, this point is stored as a teaching point.

According to the above procedures, the operation (2)→(4) can be performed by a single step. Unlike in the conventional system, the operation (3)→(4) for moving the robot to the point $P_2$ can be omitted. As a result, 1. The teaching operation time can be shortened.
2. The robot is moved by the system such that the relative position/posture between the robot and the workpiece on the rotary table are kept unchanged, thereby improving the operation precision.

As the movable device can be operated while the relative position/posture between the robot and the workpiece on the movable device are kept unchanged, the movable device can be operated without considering collision between the robot and the movable device. As a result, the teaching procedures can be simplified.

According to a first aspect of the present invention, an operating means for calculating a position/posture instruction value as an operation instruction value of the robot in accordance with an operation of the movable device so as to keep relative position/posture between the robot and the movable device unchanged comprises an operating means for calculating differences between pre- and post-operation position and posture of the movable device when the position/posture of the movable device is changed, and for calculating the position/posture instruction value as the operation instruction value of the robot by moving the position and posture of the robot by the calculated differences.

The first aspect of the present invention will be described with reference to FIG. 2.

(1) The position/posture of the movable device, the position/posture of the robot, and the relative position/posture between the movable device and the robot are given by matrices $\widetilde{U}$, $\widetilde{T}$ and $\widetilde{R}$, respectively.

(2) The movable device is moved by $\Delta \widetilde{U}$ in accordance with an input signal entered from the signal input device.

(3) In this case, when the position/posture of the robot is given by a matrix $\widetilde{T}'$, $\widetilde{T}'$ can be calculated by combining the matrices $\widetilde{T}$ and $\Delta \widetilde{U}$.

According to the present invention, the operation instruction of the movable device is assumed to be given by the matrix $\Delta \widetilde{U}$ the position/posture defined by the matrix $\widetilde{U}$. As compared with the case wherein the position/posture defined by the matrix $U'$ after the operation is given, the operation procedure for calculating the relative value can be simplified. The movement of the movable device is given by the relative value with respect to the position/posture before the operation, resulting in convenience.

In addition, the relative position/posture given by the matrix $\widetilde{R}$ between the movable device and the robot are not required, so the operating means and the memory means can be omitted. The constituting elements of the robot position/posture operating means for robot tracking can be decreased in number, and the robot position/posture operating means can be simplified to achieve simple design and manufacturing. Since the number of components is decreased, the reliability of the system can be improved According to a second aspect of the present invention, the second operating means for calculating the position/posture instruction value as the operation instruction value of the robot in correspondence with operation of the movable device comprises an operating means for calculating the position/posture instruction value as the robot operation instruction value by using the relative position/posture between the movable device and the robot and the position/posture of the movable device after the operation when the position/posture of the movable device is changed upon operation thereof, the movable device being operated in accordance with a signal from the signal input device, and at the same time, the robot being operated such that the relative position/posture between the robot and the movable device are kept unchanged. This operation is described with reference to FIG. 3.

(1) The position/posture of the movable device, the position/posture of the robot, and relative position/posture between the movable device and the robot are given by matrices $\widetilde{U}$, $\widetilde{T}$ and $\widetilde{R}$, respectively.

(2) The movable device is operated in accordance with the input signal from the signal input device and is moved to a position/posture given by a matrix $U'$.

(3) In this case, the position/posture of the robot is given by a matrix $\widetilde{T}'$, the robot is moved such that the relative position/posture between the movable device and the robot are given by the matrix $\widetilde{R}$. Therefore, the matrix $\widetilde{T}'$ can be calculated by using the matrix $U'$ representing the post-operation position of the movable device and the matrix $\widetilde{R}$.

According to the second aspect, the operation instruction for the movable device is given by the matrix $\widetilde{U}$ representing the post-operation position. As compared with the case wherein the operating instruction is given by the matrix $\Delta \widetilde{U}'$ derived from the pre-operation position/posture given by the matrix $\tilde{U}$, the procedure for calculating the post-operation position/posture can be omitted, resulting in convenience when the post-operation position/posture of the movable device is given.

According to the second aspect, the matrix $\tilde{T}'$ of the robot which represents the operation instruction value is calculated by the matrix $\tilde{U}'$ representing the post-operation position/posture of the movable device and the matrix $\tilde{R}$ representing the relative position/posture between the robot and the movable device. Therefore, without using the pre-operation position/posture of the movable device and the pre-operation position/posture of the robot need not to be used, the operation instruction value of the robot can be calculated. The matrix data representing the position and posture of the movable device and the robot need not be stored, resulting in convenience.

According to a third aspect of the present invention, the second operating means comprises a means for calculating and storing a relative matrix representing the relative position/posture between the movable device and the robot.

According to the third aspect, since the relative position/posture between the movable device and the robot can be always retrieved, teaching can be performed by checking relative position/posture therebetween. At the same time, the system can monitor operation so that the movable device may not collide against the robot.

According to a fourth aspect of the present invention, the main features lies in the fact that the robot is used as the movable device, i.e., two robots are coordinated. A first robot can track a second robot, and vice versa, thereby performing flexible teaching.

According to a fifth aspect of the present invention, a means for calculating the position/posture instruction value as the operation instruction value of the robot comprises third operating means for calculating a position/posture instruction value for operating the robot independently of the movable device in accordance with the input signal from the signal input device, in addition to the second operating means, and further has switching means for selectively switching between the position/posture instruction values from the second and third operating means, thereby setting the independent operation mode or the tracking operation mode. According to this aspect, by properly selecting the independent operation mode and the tracking operation mode, a robot having a limited movable range can perform a continuous operation for a large work area.

According to a sixth aspect of the present invention, a tracking robot apparatus has a means for storing a relative matrix representing the relative position/posture between the movable device and the robot. According to this aspect, the position/posture between the movable device and the robot can be always retrieved, thereby performing teaching by checking the position/posture therebetween.

DETAILED DESCRIPTION OF THE PREFERRED EMBODIMENTS

Figure 4A:
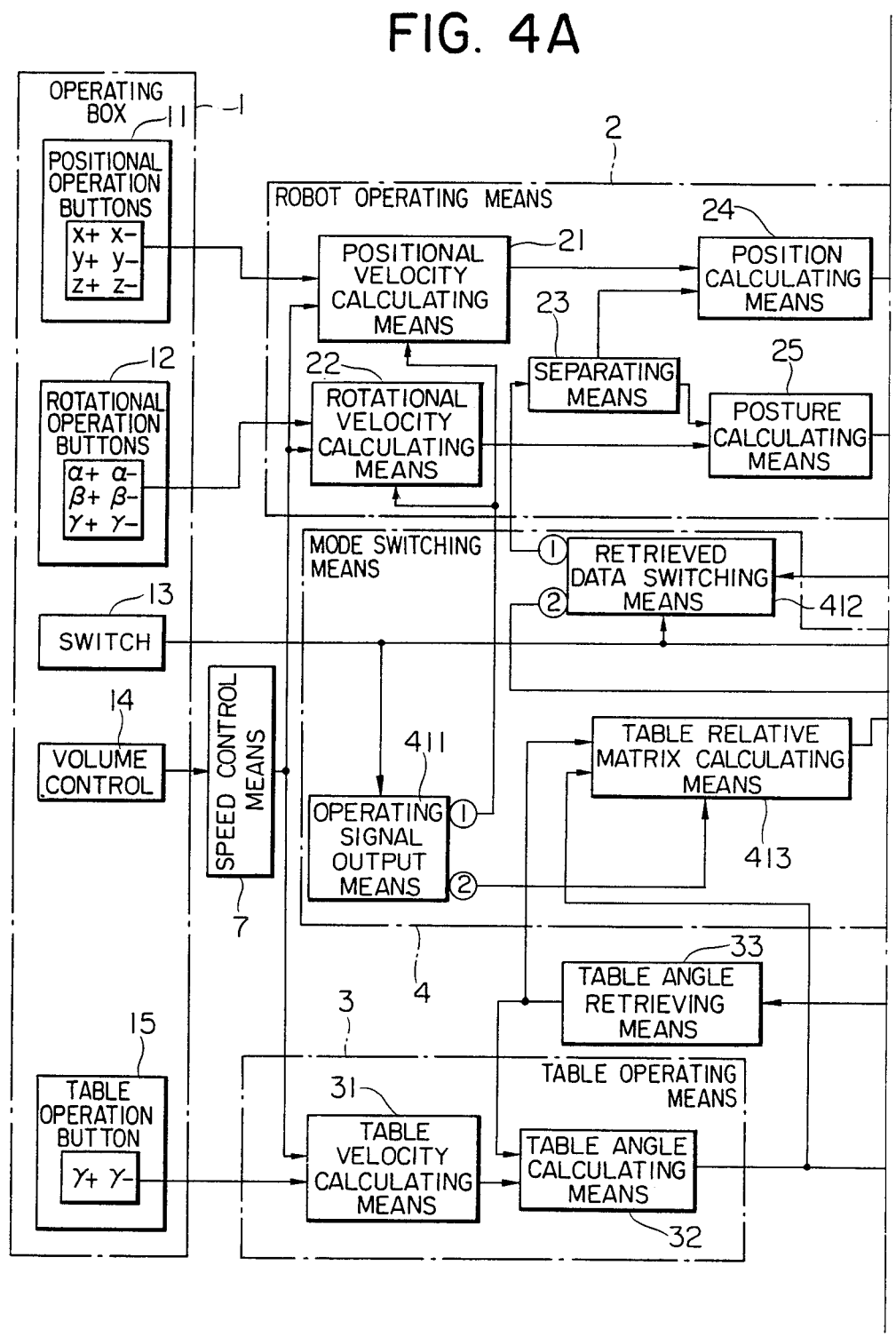
FIG. 4 is composed of FIGS. 4A and 4B and is a block diagram of a tracking robot apparatus according to a first embodiment corresponding to the first aspect of the present invention.

A tracking robot apparatus according to a first embodiment of the present invention will be described with reference to FIGS. 4A and 4B which compose FIG. 4.

The tracking robot apparatus is operated such that a system having a rotary table and a robot is operated in an independent or tracking operation mode in accordance with input signals from an operating box 1. The apparatus includes a speed control means 7, a rotary table 9, a robot 8, a table angle memory device 34, a table angle retrieving means 33, a table operating means 3, a table controller 6, a robot matrix memory device 28, a robot matrix retrieving means 27, a robot operating means 2, a mode switching means 4 and a robot controller 5.

The operating box 1 is arranged to enter an input signal. The rotary table 9 and the robot 8 are operated in accordance with the input signal.

The speed control means 7 generates a maximum operation speed in response to the input signal from the operating box 1.

The table angle memory device 34 stores a table angle calculated by the table operating means 3. The table angle retrieving means 33 retrieves the table angle from the table angle memory device 34.

The table operating means 3 calculates a table angle instruction value by using the input signal from the operating box 1, the maximum operation speed generated from the speed control means 7, and the table angle retrieved by the table angle retrieving means 33.

The table controller 6 drives the rotary table 9 in accordance with the table angle instruction value generated by the table operating means 3.

The robot matrix memory device 28 stores a robot matrix representing the position/posture of the robot which are generated through the mode switching means 4.

The robot matrix retrieving means 27 retrieves the robot matrix from the robot matrix memory device 28.

The robot operating means 2 calculates the robot matrix instruction value as the position/posture instruction value (i.e., the operating instruction of the robot) by using the input signal from the operating box 1, the maximum operation speed generated from the speed control means 7 and the data from the mode switching means 4 in independent operation mode.

The mode switching means 4 sets the operation mode in the independent or tracking operation mode in response to the input signal from the operating box 1. The mode switching means 4 supplies the robot matrix from the robot matrix retrieving means 27 to the robot operating means 2 in the independent operation mode. The robot operating means 2 is operated to generate the robot matrix instruction value calculated thereby. However, in the tracking operation mode, the mode switching means 4 calculates the robot matrix instruction value by using the robot matrix retrieved by the robot matrix retrieving means 27, the table angle instruction value generated by the table operating means 3 and the table angle retrieved by the table angle retrieving means 33 and generates the robot matrix instruction value.

The robot controller 5 drives the robot 8 in accordance with the robot matrix instruction value generated by the mode switching means 4.

The operating box 1 includes positional operation buttons 11, rotational operation buttons 12, a switch 13, a volume control 14 and table operation buttons 15.

The positional operation buttons 11 comprise an $x_+$ button for instructing positive movement of the robot along the x-axis, an $x_-$ button for instructing negative movement of the robot along the x-axis, a $y_+$ button for instructing positive movement of the robot along the y-axis, a $y_-$ button for instructing negative movement of the robot along the y-axis, a $z_+$ button for instructing positive movement of the robot along the z-axis, and an $x_-$ button for instructing negative movement of the robot along the z-axis.

The rotational operation buttons 12 comprise an $\alpha_+$ button for instructing forward rotation of the robot about the x-axis, an $\alpha_{31}$ button for instructing reverse rotation of the robot about the x-axis, a $\beta_{30}$ button for instructing forward rotation of the robot about the y-axis, a $\beta_-$ button for instructing reverse rotation of the robot about the y-axis, a $\gamma_+$ button for instructing forward rotation of the robot about the positive z-axis, and a $\gamma_-$ button for instructing reverse rotation of the robot about the z-axis.

The switch 13 selects one of the independent and tracking operation modes. A contact ① is active, when the independent operation mode is selected. However, a contact ② is active, when the tracking operation mode is selected.

The volume control 14 continuously changes the maximum value of the velocity during the operation. The speed control means 7 calculates the maximum operation velocity in accordance with the signal from the volume control 14.

The table operation buttons 15 comprises a $r_+$ button for rotating the rotary table in the forward direction and a $r_-$ button for rotating the rotary table in the reverse direction.

The table operating means 3 comprises a table velocity calculating means 31 and a table angle calculating means 32.

The table velocity calculating means 31 calculates the table rotational velocity by using the signal from the table operation buttons 15 and the maximum operation speed from the speed control means 7.

The table angle calculating means 32 calculates the table angle instruction value by using the table angle retrieved by the table angle retrieving means 33 and the table rotational velocity generated from the table velocity calculating means 31.

The table controller 6 comprises a table servo device 61. The table servo device 61 drives the rotary table 9 in accordance with the table angle instruction value generated from the table angle calculating means 32.

The robot operating means 2 comprises a positional velocity calculating means 21, a rotational velocity calculating means 22, a separating means 23, a position calculating means 24, a posture calculating means 25 and a combining means 26.

The positional velocity calculating means 21 calculates a positional velocity of the robot by using the signal from the positional operation button 11 and the maximum operating speed from the speed control means 7.

The rotational velocity calculating means 22 calculates the rotational velocity of the robot by using the signal from the rotational operation buttons 12 and the maximum operation speed from the speed control means 7.

The separating means 23 separates the robot matrix data supplied from the mode switching means 4 into a robot position component and a robot posture component.

The position calculating means 24 calculates the position component instruction value of the robot by using the robot position component generated from the separating means 23 and the robot positional velocity generated from the positional velocity calculating means 21.

The posture calculating means 25 calculates a posture component instruction value of the robot by using the robot posture component generated from the separating means 23 and the robot rotational velocity generated from the rotational velocity calculating means 22.

The combining means 26 combines the robot position component instruction value calculated by the position calculating means 24 and the robot posture component instruction value calculated by the posture calculating means 25 to generate a robot matrix instruction value.

The mode switching means 4 comprises an operating signal output means 411, a retrieved data switching means 412, a table relative matrix calculating means 413, a tracking calculating means 414 and a robot matrix switching means 415.

The operating signal output means 411 causes the positional velocity calculating means 21 and the rotational velocity calculating means 22 to operate in accordance with the signal from the switch 13 in the independent mode. However, in the tracking operation mode, the operating signal output means 411 causes the table relative matrix calculating means 413 to operate in accordance with the signal from the switch 13.

The retrieved data switching means 412 supplies the robot matrix data from the robot matrix retrieving means 27 to the separating means 23 in response to the signal from the switch 13 in the independent operation mode. However, in the tracking operation mode, the retrieved data switching means 412 supplies the data from the robot matrix retrieving means 27 to the tracking calculating means 414.

The table relative matrix calculating means 413 calculates a table relative matrix representing table position and posture before and after the operation by using the table angle instruction value calculating by the table angle calculating means 32 and the table angle retrieved by the table angle retrieving means 33.

The tracking calculating means 414 calculates the robot matrix instruction value as the position/posture instruction value of the robot under the assumption that the robot is displaced by the table relative matrix derived by the table relative matrix calculating means 413 from the robot matrix retrieved from the retrieved data switching means 412.

The robot matrix switching means 415 supplies the robot matrix instruction value to the combining means 26 in response to the signal from the switch 13 in the independent operation mode. However, in the tracking operation mode, the robot matrix switching means 415 supplies the robot matrix instruction value from the tracking calculating means 414 to the combining means 26.

The robot controller 5 comprises a joint angle calculating means 51 and a robot servo device 52. The joint angle calculating means 51 calculates each joint angle instruction value of the robot from the robot matrix instruction value obtained from the robot matrix switching means 415.

The robot servo device 52 drives the robot 8 in accordance with each joint angle instruction value calculated by the joint angle calculating means 51.

The mode of operation in the independent operation mode (i.e., the switch 13 is set in the position ①) will be described.

The speed control means 7 calculates the maximum operation speed in accordance with the signal from the volume control 14.

The table velocity calculating means 31 calculates the rotary table rotational velocity in accordance with the signal from the table operation button 15 and the maximum operation speed calculated by the speed control means 7.

The table angle calculating means 32 calculates the table angle instruction value by using the table angle retrieved by the table angle retrieving means 33 from the table angle memory device 34 and the rotary table rotational velocity calculated by the table velocity calculating means 31.

The table angle instruction value calculated by the table angle calculating means 32 is stored in the table angle memory device 34 and the table servo device 61. The table servo device 61 drives the rotary table 9 in accordance with the table angle instruction value.

The operating signal output means 411 causes the positional velocity calculating means 21 and the rotational velocity calculating means 22 since the switch 13 is set in the independent mode position ①.

The positional velocity calculating means 21 calculates the positional velocity of the robot by using the signal from the positional operation button 11 and the maximum operation velocity generated by the speed control means 7.

The rotational velocity calculating means 22 calculates the rotational velocity of the robot in accordance with the signal from the rotational operation button 12 and the maximum operation velocity calculated by the speed control means 7.

The retrieved data switching means 412 supplies to the separating means 23 the robot matrix retrieved by the robot matrix retrieving means 27 from the robot matrix memory device 28 since the switch 13 is set in the independent operation mode position ①. The separating means 23 separates the robot matrix into the robot position component and the robot posture component.

The position calculating means 24 calculates the position component instruction value of the robot by using the robot position component generated from the separating means 23 and the robot positional velocity calculated by the positional velocity calculating means 21.

The posture calculating means 25 calculates the posture component instruction value of the robot by using the robot posture component generated from the separating means 23 and the robot rotational velocity calculated by the rotational velocity calculating means 22.

The combining means 26 combines the robot position component instruction value calculated by the position calculating means 24 and the robot posture component instruction value calculated by the posture calculating means 25 to generate the robot matrix instruction value as the position/posture instruction value of the robot.

The robot matrix switching means 415 supplies to the robot matrix memory device 28 and the joint angle calculating means 51 the robot matrix instruction value calculated by the combining means 26 since the switch 13 is set in the independent operation mode position ①.

The joint angle operating means 51 calculates each joint angle instruction value of the robot in accordance with the robot matrix instruction value supplied from the robot matrix switching means 415.

The robot servo device 52 drives the robot 8 in accordance with each joint angle instruction value of the robot which is calculated by the joint angle calculating means 51.

The mode of operation will be described when the switch 13 is set in the tracking operation mode position ②.

In this case, the speed control means 7, the table velocity calculating means 31, the table angle memory device 34, the table angle retrieving means 33, the table angle calculating means 32 and the table servo device 61 are operated in accordance with the signal from the volume control 14 and the signal from the table operation button 15 in the same manner as in the independent operation mode.

Since the switch 13 is set in the tracking operation mode position 2 , the operating signal output means 411 causes the table relative matrix calculating means 413 to operate.

The table relative matrix calculating means 413 calculates the table relative matrix representing the relative position and posture of the table before and after the operation in accordance with the table angle instruction value calculated by the table angle calculating means 32 and the table angle retrieved by the table angle retrieving means 33 from the table angle memory device 34.

The retrieved data switching means 412 supplies to the tracking calculating means 414 the robot matrix retrieved by the robot matrix retrieving means 27 from the robot matrix memory device 28 since the switch 13 is set in the tracking operation mode position 2 .

The tracking calculating means 414 calculates the robot matrix instruction value as the robot position/posture instruction value under the assumption that the robot is also displaced by the table relative matrix derived by the table relative calculating means 13 from the robot matrix.

The robot matrix switching means 415 stores in the robot matrix memory device 28 the robot matrix instruction value calculated by the tracking calculating means 414 since the switch 13 is set in the tracking operation mode position ②. At the same time, this matrix instruction value is also supplied to the joint angle operating means 51.

The joint angle calculating means 51 calculates each joint angle instruction value of the robot in accordance with the robot matrix instruction value supplied from the robot matrix switching means 415.

The robot servo device 52 drives the robot 8 in accordance with each joint angle instruction value of the robot which is calculated by the joint angle calculating means 51.

In this embodiment, when the switch 13 is set in the independent operation ①, the rotary table 9 and the robot 8 can be independently operated upon operation of the operating box 1. However, when the switch 13 is set in the tracking operation mode position ②, the rotary table is operated together with the robot upon operation of the operating box 1. Therefore, a single operating system consisting of the rotary table and the robot is obtained wherein relative position and posture thereof are kept unchanged.

Figure 1:
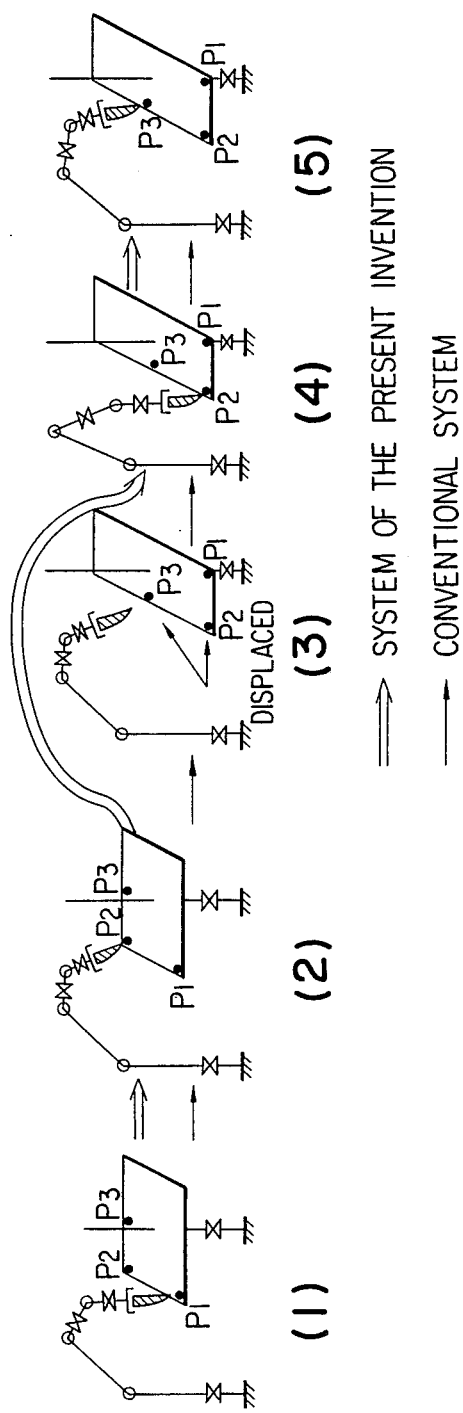
FIG. 1 is an explanatory diagram for explaining the teaching procedures of continuous work points $P_1$, $P_2$ and $P_3$ in a system having a rotary table and a robot so as to compare the conventional system with a system of the present invention.
Figure 2:
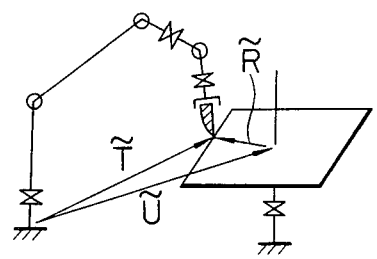
FIG. 2 is an explanatory diagram for explaining the principle of calculating a position/posture instruction value according to a first aspect of the present invention.
Figure 2:
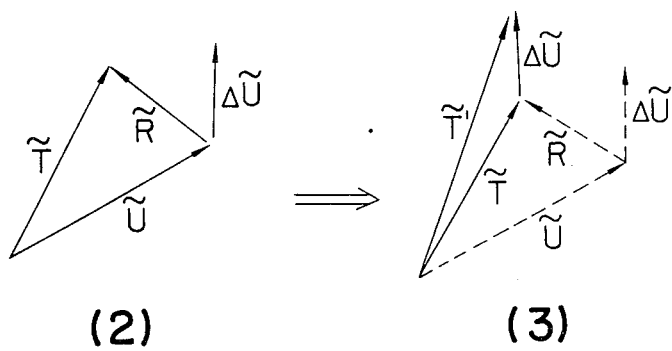
Figure 3:
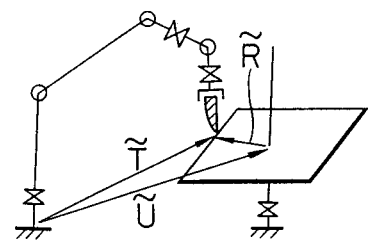
FIG. 3 is an explanatory diagram for explaining the principle of calculating a position/posture instruction value according to a second aspect of the present invention.
Figure 3:
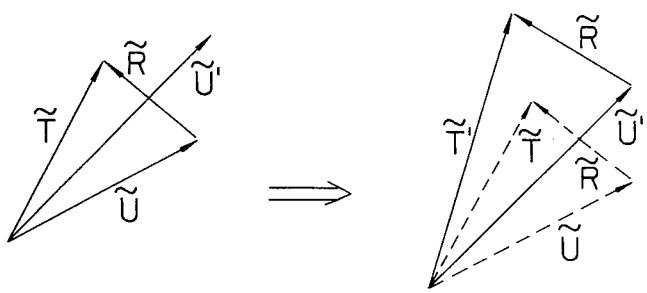

The teaching procedures (1) to (5) of FIG. 1 will be performed in the following steps according to this embodiment.

(1) Since the robot is located at the point $P_1$, this point is stored as a teaching point.

(1)→(2) The switch 13 is set in the independent operation mode position ①, and the maximum speed is set by the volume control 14. The robot is moved to the position $P_2$ by using the positional and rotational operation buttons 11 and 12.

(2) Since the robot is located at the point $P_2$, this point is stored as the teaching point.

(2)→(4) The switch 13 is set in the tracking operation mode ②, and the maximum speed is set by the volume control 14. The rotary table is rotated by using the table operation button 15 and at the same time the robot is operated.

(4) The robot is located at the point $P_2$.

(4)→(5) The switch 13 is set in the independent operation mode position ①, and the maximum speed is set by the volume control 14. The robot is moved to the point $P_3$ by using the positional and rotational operation buttons 11 and 12.

(5) Since the robot is located at the point $P_3$, this point is stored as a teaching point.

In this embodiment, since the rotary table is used, the relative posture of the robot and the rotary table are kept unchanged in the procedure (2)→(4), thereby providing a great advantage. More particularly, continuous work often requires the relative posture of the robot and the rotary table be kept unchanged. When the tracking operation mode is not used, the relative posture of the robot and the rotary table are changed. It is very difficult to restore the previous relative posture of the robot and the rotary table, resulting in time-consuming operation with degradation of precision. When this embodiment is used, the correction operation can be omitted, so that the teaching time can be shortened, and the teaching precision can be improved.

In this embodiment, the table relative matrix calculating means 413 calculates the table relative matrix by using the table angle instruction value calculated by the table angle calculating means 32 and the table angle retrieved by the table angle retrieving means 33. However, the table relative matrix may be derived from the table rotational velocity calculated by the table velocity calculating means 31.

As a modification, the robot operating means 2 may be always operative, the output from the robot matrix retrieving means 27 may be supplied to the separating means 23, and the output from the combining means 26 may be supplied to the tracking calculating means 414. Alternatively, the output from the tracking calculating means 414 may be supplied to the separating means 23. In this case, the output from the combining means 26 may be stored in the robot matrix memory device 28 and the joint angle calculating means 51. Then, the robot can track the table rotation and at the same time change the position and posture relative to the rotary table.

In the above embodiment, the rotary table may be replaced with a slide table which is linearly driven.

Figure 5A:
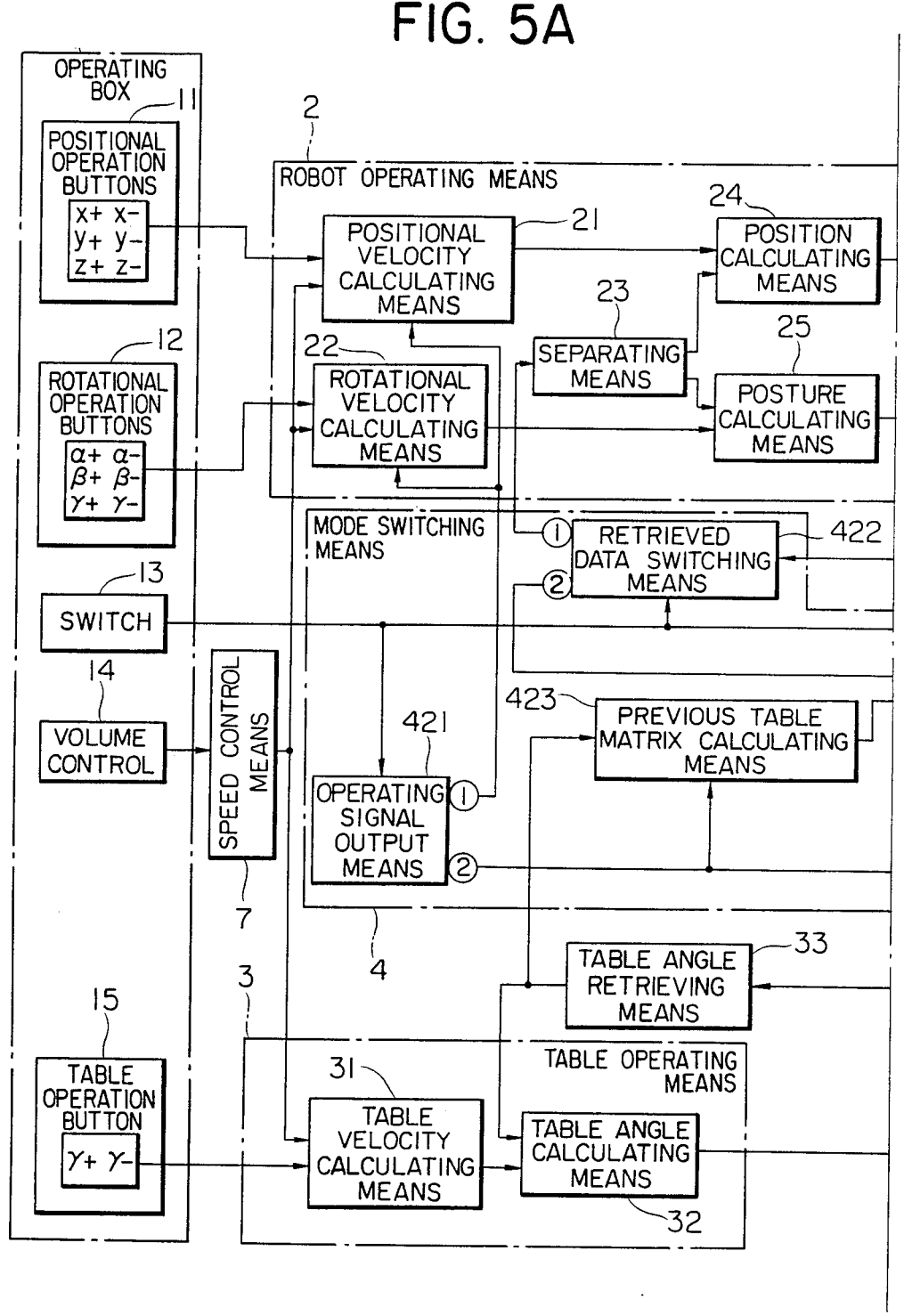
FIG. 5 is composed FIGS. 5A and 5B and is a block diagram of a tracking robot apparatus according to a second embodiment corresponding to the second aspect of the present invention.

A tracking robot apparatus according to a second embodiment of the present invention will be described with reference to FIG. 5.

In this apparatus, the system having the rotary table and the robot is operated in accordance with the input signal from the operating box in the independent or tracking operation mode. The apparatus comprises an operating box 1, a speed control means 7, a rotary table 9, a robot 8, a table angle memory device 34, a table angle retrieving means 33, a table operating means 3, a table controller 6, a robot matrix memory device 28, a robot matrix retrieving means 27, a robot operating means 2, a mode switching means 4 and a robot controller 5.

The operating box 1, the speed control means 7, the rotary table 9, the robot 8, the table angle memory device 34, the table angle retrieving means 33, the table operating means 3, the table controller 6, the robot matrix memory 28, the robot matrix retrieving means 27, the robot operating means 2 and the robot controller 5 are the same as those in the first embodiment.

The mode switching means 4 selects one of the independent and tracking operation modes in response to the input signal from the operating box 1.

The mode switching means 4 supplies a robot matrix as the input data from the robot matrix retrieving means 27 to the robot operating means 2 in the independent operation mode. At the same time, the mode switching means 4 supplies an operating signal to the robot operating means 2, thereby operating the robot operating means 2 and hence obtaining a robot matrix instruction value. The mode switching means 4 finally generates the robot matrix instruction value.

However, in the tracking operation mode, the mode switching means 4 calculates the robot matrix instruction value by using the robot matrix retrieved from the robot matrix retrieving means 27, the table angle instruction value generated from the table operating means 3, and the table angle retrieved by the table angle retrieving means 33, and generates the robot matrix instruction value.

The mode switching means 4 comprises an operating signal output means 421, a retrieved data switching means 422, a previous table matrix calculating means 423, a relative matrix calculating means 424, a table matrix calculating means 425, a tracking calculating means 426 and a robot matrix switching means 427.

The operating signal output means 421 causes the positional velocity operating means 21 and the rotational velocity calculating means 22 to operate in response to the signal from a switch 13 in the independent operation mode. However, in the tracking operation mode, the operating signal output means 421 causes the previous table matrix calculating means 423 and the table matrix calculating means 425 to operate in response to the signal from the switch 13.

The retrieved data switching means 422 supplies the robot matrix data from the robot matrix retrieving means 27 to the separating means 23 in response to the signal from the switch 13 in the independent operation mode. However, in the tracking operation mode, this robot matrix data is supplied to the relative matrix calculating means 424.

The previous table matrix calculating means 423 calculates a table matrix corresponding to the table position and posture in accordance with the table angle retrieved by the table angle retrieving means 33.

The relative matrix calculating means 424 calculates a relative matrix representing the relative position and posture of the robot and the rotary table in accordance with the robot matrix which is supplied from the retrieved data switching means 422 and which represents the robot position and posture and the table matrix which is calculated by the previous table matrix calculating means 423 and which represents the table position and posture.

The table matrix calculating means 425 calculates a table matrix instruction value corresponding to the table position and posture in accordance with the table angle instruction value calculated by the table angle calculating means 32.

The tracking calculating means 426 calculates a robot matrix instruction value as the position/posture instruction value of the robot in accordance with the table matrix instruction value calculated by the table matrix calculating means 425 and the relative matrix which is calculated by the relative matrix calculating means 424 and which represents the relative position and posture of the rotary table and the robot.

The robot matrix switching means 427 generates the robot matrix instruction value calculated by the combining means 26 in response to the signal from the switch 13 in the independent operation mode. However, in the tracking mode, the robot matrix switching means 427 generates the robot matrix instruction value calculated by the tracking calculating means 426. And when the robot matrix instruction value is stored in the robot matrix memory device 28 and supplied it to the joint angle calculating means 51.

The mode of operation will be described when the switch 13 is set in the independent operation mode position ①.

The speed control means 7, the table velocity calculating means 31, the table angle memory device 34, the table angle retrieving means 33, the table angle calculating means 32, the table servo device 61 and the like are operated in the same manner as in the first embodiment. The rotary table 9 is operated in response to the signals from a volume control 14 and table operation buttons 15.

The operating signal output means 421 causes the positional and rotational velocity calculating means 21 and 22 to operate since the switch 13 is set in the independent operation mode position ①, thereby operating the robot operating means 2.

The retrieved data switching means 422 supplies to the separating means 23 the robot matrix retrieved by the robot matrix retrieving means 27 from the robot matrix memory device 28 since the switch 13 is set in the independent operation mode position ①.

The positional velocity calculating means 21, the rotational velocity operating means 22, the separating means 23, the position calculating means 24, the posture calculating means 25, the combining means 26 and the like are operated in the same manner as in the first embodiment. The robot matrix instruction value as the position/posture instruction value of the robot is calculated in accordance with a signal from the positional operation button 11, a signal from the rotational operation button 12, a maximum operating speed calculated by the speed control means 7 and the robot matrix retrieved through the retrieved data switching means 422. The robot matrix value is generated from the combining means 26.

The robot matrix switching means 427 stores in the robot matrix memory device 28 and the joint angle calculating means 51 a robot matrix instruction value calculated by the combining means 26 since the switch 13 is set in the independent operation mode ①.

The joint angle calculating means 51 calculates each joint angle instruction value of the robot in accordance with the robot matrix instruction value supplied from the robot matrix switching means 427.

The robot servo device 52 drives the robot 8 on the basis of each joint angle instruction value of the robot which is calculated by the joint angle calculating means 51.

The mode of operation will be described when the switch 13 is set in the tracking operation mode postion ②.

In this case, the speed control means 7, the table velocity calculating means 31, the table angle memory device 34, the table angle retrieving means 33, the table angle calculating means 32, and the table servo device 61 are operated in the same manner as in the independent operation mode. The rotary table 9 is rotated in response to the signals from the volume control 14 and the table operation buttons 15.

The operating signal output means 421 causes the previous table matrix calculating means 423 and the table calculating means 425 to operate since the switch 3 is set in the tracking operation mode position ②.

The previous table matrix calculating means 423 calculates a table matrix corresponding to the table position and posture in accordance with the table angle retrieved by the table angle retrieving means 33 from the table angle memory device 34.

The table matrix calculating means 425 calculates a table matrix instruction value corresponding to the table position/posture instruction value in accordance with the table angle instruction value calculated by the table angle calculating means 32.

The retrieved data switching means 422 supplies to the relative matrix calculating means 424 the robot matrix retrieved by the robot matrix retrieving means 27 from the robot matrix memory device 28 since the switch 13 is set in the tracking operation mode position ②.

The relative matrix calculating means 424 calculates a relative matrix representing the relative position and posture of the robot and the rotary table in accordance with the robot matrix which is supplied from the retrieved data switch means 422 and which represents the robot position and posture and the table matrix which is calculated by the previous table matrix calculating means 423 and which represents the table position and posture.

The tracking calculating means 426 calculates a robot matrix instruction value as the position/posture instruction value of the robot in accordance with the table matrix instruction value calculated by the table matrix calculating means 425 and the relative matrix calculated by the relative matrix calculating means 424.

The robot matrix switching means 427 stores in the robot matrix memory device 28 the robot matrix instruction value calculated by the tracking calculating means 426 since the switch 13 is set in the tracking operation mode position ②. At the same time, the robot matrix instruction value is also supplied to the joint angle calculating means 51.

The joint angle calculating means 51 calculates each joint angle instruction value of the robot in accordance with the robot matrix instruction value supplied from the robot matrix switching means 427.

The robot servo device 52 drives the robot 8 on the basis of each joint angle instruction value of the robot which is calculated by the joint angle calculating means 51.

The second embodiment realizes the first embodiment by another apparatus. In the same manner as in the first embodiment, the teaching time can be shortened, and teaching precision can be improved.

In the same manner as in the first embodiment, the robot can change the position and posture relative to the rotary table while the robot performs tracking of the rotary table.

In the second embodiment, it is easy to modify the arrangement such that the relative position and posture of the rotary table and the robot can be easily retrieved by the relative matrix calculating means 424.

In the second embodiment, the rotary table can be replaced with a slide table which is linearly driven.

A tracking robot apparatus according to a third embodiment of the present invention will be described. In this embodiment, the relative matrix representing the relative position and posture of the rotary table and the robot can be always calculated and stored as a result of an improvement of the second embodiment.

Figure 6B:
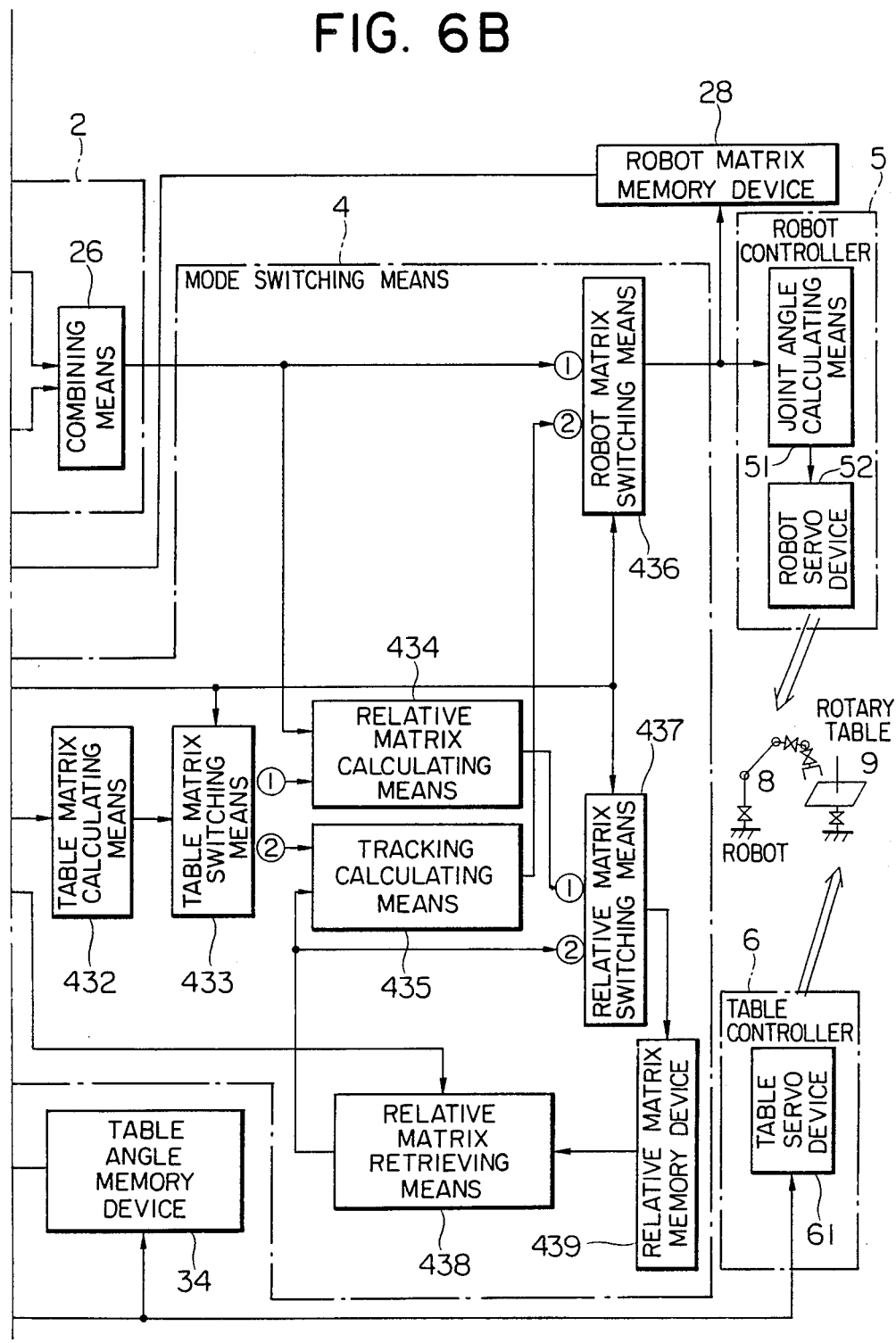
FIG. 6 is composed of FIGS. 6A and 6B and is a block diagram of a tracking robot apparatus according to a third embodiment corresponding to the third aspect of the present invention.

The tracking robot apparatus of this embodiment will be described with reference to FIG. 6. The tracking robot apparatus is arranged to drive a system consisting of a rotary table and a robot in the independent or tracking operation mode. The apparatus comprises an operating box 1, a speed control means 7, a rotary table 9, a robot 8, a table angle memory device 34, a table angle retrieving means 33, a table operating means 3, a table controller 6, a robot matrix memory device 28, a robot matrix retrieving means 27, a robot operating means 2, a mode switching means 4 and a robot controller 5.

The operating box 1, the speed control means 7, the rotary table 9, the robot 8, the table angle memory device 34, the table angle retrieving means 33, the table operating means 3, the table controller 6, the robot memory device 28, the robot operating means 2 and the robot controller 5 are the same as those in the first and second embodiments.

The robot matrix retrieving means 27 retrieves a robot matrix from the robot matrix memory device 28 and supplies the retrieved data to the robot operating means 2.

The mode switching means 4 selects one of the independent and tracking operation modes in response to an input signal generated from the operating box 1.

The mode switching means 4 supplies an operating signal to the robot matrix retrieving means 27 and the robot operating means 2 which are then operated to generate a robot matrix instruction value in the independent operation mode. The mode switch means 4 then generates the robot matrix instruction value.

However, in the tracking operation mode, the mode switching means 4 calculates a robot matrix instruction value in accordance with the table angle instruction value generated from the table operating means 3 and generates the robot matrix instruction value.

The mode switching means 4 comprises an operating signal output means 431, a table matrix calculating means 432, a table matrix switching means 433, a relative matrix calculating means 434, a tracking calculating means 435, a robot matrix switching means 436, a relative matrix switching means 437, a relative matrix memory device 439 and a relative matrix retrieving means 438.

The operating signal output means 431 causes the robot matrix retrieving means 27 and a positional velocity calculating means 21 and rotational velocity calculating means 22 to operate in response to the signal from a switch 13 in the independent operation mode. However, in the tracking operation mode, the operating signal output means 431 causes the relative matrix retrieving means 438 to operate in response to the signal from the switch 13.

The table matrix calculating means 432 calculates a table matrix instruction value corresponding to the rotary table position and posture in accordance with the table angle instruction value calculated by the table angle calculating means 32.

In the independent operation mode, the table matrix switching means 433 supplies to the relative matrix calculating mean 434 the table matrix instruction value calculated by the table matrix calculating means 432 in response to the signal from the switch 13. However, in the tracking operation mode, the table matrix switching means 433 supplies the table matrix instruction value to the tracking calculating means 435.

The relative matrix calculating means 434 calculates a relative matrix as the relative position and posture of the robot and the rotary table in accordance with the robot matrix instruction value as the robot position/posture instruction value calculated by the combining means 26 and the table matrix instruction value supplied from the table matrix switching means 433.

The relative matrix memory device 439 stores the relative matrix of the robot and the rotary table.

The relative matrix retrieving means 438 retrieves the relative matrix from the relative matrix memory device 439.

The tracking calculating means 435 calculates a robot matrix as a robot position/posture instruction value in accordance with the table matrix instruction value supplied from the table matrix switching means 433 and the relative matrix supplied from the relative matrix retrieving means 438.

The robot matrix switching means 436 generates the robot matrix instruction value calculated by the combining means 26 in response to the signal from the switch 13 in the independent operation mode. However, in the tracking operation mode, the robot matrix switching means 436 generates the robot matrix instruction value calculated by the tracking calculating means 435. The robot matrix instruction value is stored in the robot matrix memory device 51 and is supplied to the joint angle calculating means 51.

The relative matrix switching means 437 generates the relative matrix calculated by the relative matrix calculating means 434 in response to the signal from the switch 13 in the independent operation mode. However, in the tracking operation mode, the relative matrix switch means 437 generates the relative matrix retrieved by the relative matrix retrieving means 438. The resultant relative matrix is stored in the relative matrix memory device 439.

The mode of operation will be described when the switch 13 is set in the independent operation mode position ①.

The speed control mean 7, the table velocity calculating means 31, the table angle memory device 34, the table angle retrieving means 33, the table angle calculating means 32 and the table servo device 61 are operated in the same manner as in the first and second embodiments. The rotary table 9 is rotated in accordance with the signals from a volume control 14 and table operation buttons 15.

The operating signal output means 431 causes the positional and rotational velocity calculating means 21 and 22 to operate since the switch 13 is set in the independent operation mode position ①. At the same time, the robot matrix retrieving means 27 is operated.

The positional velocity calculating means 21, the rotational velocity calculating means 22, the separating means 23, the position calculating means 24, the posture calculating means 25 and the combining means 26 are operated in the same manner as in the first and second embodiments. The combining means 26 calculates and generates the robot matrix instruction value as the robot position/posture instruction value in accordance with the signal from the positional operation button 11, the signal from the rotational operation button 12, the maximum operation speed calculated by the speed control means 7 and the robot matrix retrieved by the robot matrix retrieving means 27 from the robot matrix memory device 28.

The robot matrix switching means 436 causes the robot matrix memory device 28 to store the robot matrix instruction value supplied from the combining means 26 since the switch 13 is set in the independent operation mode position ①. At the same time, this robot matrix instruction value is also supplied to the joint angle calculating means 51.

The joint angle calculating means 51 and the robot servo device 52 are operated to drive the robot 8 in the same manner as in the first and second embodiments.

The table matrix calculating means 432 calculates the table matrix instruction value corresponding to the table position/posture in accordance with the table angle instruction value calculated by the table angle calculating means 32.

The table matrix switching means 433 supplies to the relative matrix calculating means 434 the table matrix instruction value calculated by the table matrix calculating means 432 since the switch 13 is set in the independent operation mode position ①.

The relative matrix calculating means 434 calculates a relative matrix representing the relative position and posture of the robot and the rotary table in accordance with the robot matrix instruction value calculated by the combining means 26 and the table matrix instruction value supplied from the table matrix switching means 433.

The relative matrix switching means 437 causes the relative matrix memory device 439 to store the relative matrix calculated by the relative matrix calculating means 434 since the switch 13 is set in the independent operation mode ①.

The mode of operation will be described when the switch 13 is set in the tracking operation mode position ②.

In this case, the speed control means 7, the table velocity calculating means 31, the table angle memory device 34, the table angle retrieving means 33, the table angle calculating means 32 and the table servo device 61 are operated in the same manner as in the independent operation mode. The rotary table 9 are operated in response to the signals from the volume 14 and the table operation buttons 15.

The operating signal output means 431 causes the relative matrix retrieving means 438 to operate since the switch 13 is set in the tracking operation mode position ②.

The relative matrix retrieving means 438 reads out the relative matrix representing the relative position and posture of the robot and the rotary table from the relative matrix memory device 439.

The relative matrix switching means 437 causes the relative matrix memory device 439 to store the relative matrix read out by the relative matrix retrieving means 438 since the switch 13 is set in the tracking operation mode position ②.

The table matrix calculating means 432 calculates the table matrix instruction value corresponding to the table position/posture of the table in accordance with the table angle instruction value calculated by the table angle calculating means 32.

The table matrix switching means 433 supplies to the tracking calculating means 435 the table matrix instruction value calculated by the table matrix calculating means 432 since the switch 13 is set in the tracking operation mode position ②.

The tracking calculating means 435 calculates the robot matrix instruction value as the position/posture instruction value of the robot in accordance with the table matrix instruction value supplied from the table matrix switching means 433 and the relative matrix read out from the relative matrix retrieving means 438.

The robot matrix switching means 436 causes the robot matrix memory device 28 to store the robot matrix instruction value calculated by the tracking calculating means 435 since the switch 13 is set in the tracking operation mode position ②. At the same time, this robot matrix instruction value is also supplied to the joint angle calculating means 51.

The joint angle calculating means 51 and the robot servo device 52 are operated to operate the robot 8 in the same manner as in the independent operation mode.

This embodiment is an improvement of the second embodiment. The teaching operation of FIG. 1 can be applied to the third embodiment, thereby shortening the teaching time and improving the teaching precision.

The apparatus of the third embodiment can be applied such that the robot can change its position and posture relative to the rotary table while the robot tracks the rotary table in the same manner as in the first and second embodiments.

In the third embodiment, since the relative position and posture of the rotary table and the robot can be always retrieved by the relative matrix memory device 439, teaching can be performed while the relative position and posture thereof can be checked so as not to cause the robot to collide against the rotary table.

The rotary table may be replaced with a slide table which is linearly driven.

Figure 7A:
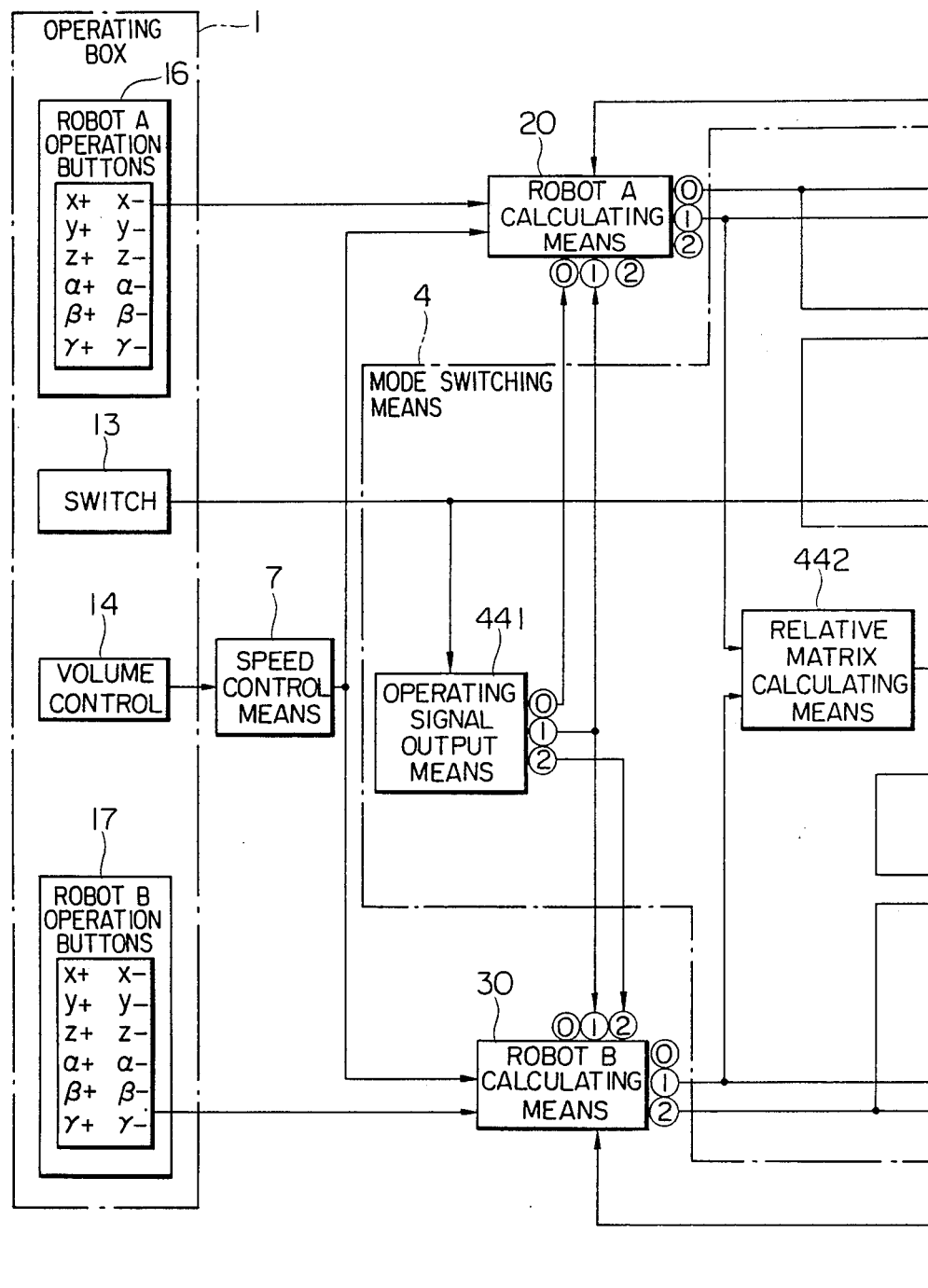
FIG. 7 is composed of FIGS. 7A and 7B and is a block diagram of a tracking robot apparatus according to a fourth embodiment corresponding to the fourth aspect of the present invention.

A tracking robot apparatus according to a fourth embodiment of the present invention will be described with reference to FIG. 7.

The apparatus drives a system consisting of robots A and B in response to an input signal from the operating box in the independent operation mode, a robot B tracking operation mode for tracking the robot A by the robot B, or a robot A tracking operation mode for tracking the robot B by the robot A.

The apparatus comprises an operating box 1, a speed control means 7, a robot A80, a robot A matrix memory device 29, a robot A calculating means 20, a robot A controller 50, a robot B90, a robot B matrix memory device 36, a robot B calculating means 30, a robot B controller 60 and a mode switching means 4.

The operating box 1 comprises a signal input device. The robots A80 and B90 are operated in response to the input signals at the operating box 1.

The speed control means 7 generates a maximum operating velocity in response to the input signal from the operating box 1.

The robot A matrix memory device 29 stores a robot A matrix representing the position and posture of the robot A which is generated from the mode switching means 4.

The robot A calculating means 20 is operated in the independent operation mode or the robot B tracking operation mode and calculates a robot A matrix instruction value as the position/posture instruction value of the robot A by using the input signal from the operating box 1, the maximum operating velocity from the speed control means 7, and the robot matrix generated from the robot A matrix memory device 29.

The robot B matrix memory device 36 stores a robot B matrix which represents the position and posture of the robot B and which is generated from the mode switching means 4.

The robot B calculating means 30 is operated in the independent operation mode or the robot A tracking operation mode and calculates a robot B matrix instruction value as the position/posture instruction value of the robot B by using the input signal from the operating box 1, the maximum operating velocity from the speed control means 7 and the robot B matrix generated from the robot B matrix memory device 36.

The mode switching means 4 selects one of the independent operation mode, the robot B tracking operation mode and the robot A tracking operation mode in response to the input signal from the operating box 1. The robot A matrix instruction value calculated by the robot A calculating means 20, the robot A matrix instruction value calculated by the robot B calculating means 30 or the robot A matrix instruction value derived from the robot B matrix instruction value is selected in accordance with the given operation mode.

The robot A controller 50 drives the robot A80 in response to the robot A matrix instruction value generated from the mode switching means 4.

The robot B controller 60 drives the robot B90 in response to the robot B matrix instruction value generated from the mode switching means 4.

The operating box 1 comprises robot A operation buttons 16, a switch 13, a volume control 14 and robot B operation buttons 17.

The robot A operation buttons 16 comprise an $x_+$ button for designating positive movement along the x-axis, an $x_-$ button for designating negative movement along the x-axis, a $y_+$ button for designating positive movement along the y-axis, a $y_-$ button for designating negative movement along the y-axis, a $z_+$ button for designating positive movement along the z-axis, a $z_-$ button for designating negative movement along the z-axis, an $\alpha_+$ button for designating forward rotation along the x-axis, an $\alpha_-$ button for designating reverse rotation along the x-axis, a $\beta_+$ button for designating forward rotation along the y-axis, a $\beta_-$ button for designating reverse rotation along the y-axis, a $\gamma_+$ button for designating forward rotation along the z-axis and a $\gamma_-$ button for designating reverse rotation along the z-axis. The signals from the robot A operation buttons 16 are selectively supplied to the robot A calculating means 20.

The switch 13 selects one of the independent operation mode, the robot B tracking operation mode for the robot A, and the robot A tracking operation mode for the robot B. When the independent operation mode is set, the switch 13 is set in a position ①. When the robot B tracking mode for the robot A is set, the switch 13 is set in a position ⓪. When the robot A tracking mode for the robot B is set, the switch 13 is set in a position ②.

The volume control 14 continuously changes the maximum velocity during operation, and the speed control means 7 calculates the maximum operation velocity in accordance with the signal from the volume control 14.

The robot B operation buttons 17 designate the operations of the robot B and have the same arrangement as the robot A operation buttons 16. Signals from the robot A operation buttons 16 are supplied to the robot B calculating means 30.

The mode switching means 4 comprises an operating signal output means 441, a relative matrix calculating means 442, a robot B tracking calculating means 443, a robot A tracking calculating means 444, a robot A matrix switching means 445, a robot B matrix switching means 446 and a relative matrix memory device 447.

The operating signal output means 441 causes the robot A and B calculating means 20 and 30 to operate when the switch 13 is set in the independent operation mode position ①, the robot A calculating means 20 to operate when the switch 13 is set in the robot B tracking operation mode ⓪, and the robot B calculating means 30 when the switch 13 is set in the robot A tracking operation mode position ②. The relative matrix calculating means 442 calculates a relative matrix representing the relative position and posture of the robots A and B in accordance with the robot A matrix calculated by the robot A calculating means 20 and the robot B matrix calculated by the robot B calculating means 30.

The relative matrix memory device 447 stores the relative matrices of the robots A and B. When the switch 13 is set in the independent mode position ①, the relative matrix memory device 447 stores the relative matrix calculated by the relative matrix calculating means 442. When the switch 13 is set in the robot B tracking operation mode position ⓪, the relative matrix is supplied to the robot B tracking calculating means 443 and is stored therein. When the switch 13 is set in the robot A tracking operation mode position ②, the relative matrix is supplied to the robot A tracking calculating means 444 and is stored therein.

The robot B tracking calculating means 443 calculates a robot B matrix representing the position and posture of the robot B in accordance with the robot A matrix calculated by the robot A calculating means 20 and the relative matrices of the robots A and B which are read out from the relative matrix memory device 447.

The robot A tracking calculating means 444 calculates the robot A matrix representing the position and posture of the robot A in accordance with the robot B matrix calculated by the robot B calculating means 30 and the relative matrices of the robots A and B which are read out from the relative matrix memory device 447.

The robot A matrix switching means 445 causes the robot A matrix memory device 29 to store the robot A matrix calculated by the robot A calculating means 20 when the switch 13 is set in the independent operation mode position ①) and the robot B tracking operation mode position ⓪, and at the same time, this robot A matrix is also supplied to the robot A controller 50. However, when the switch 13 is set in the robot A tracking operation mode position②, the robot A matrix calculated by the robot A tracking calculating means 444 is stored in the robot A matrix memory device 29 and is also supplied to the robot A controller 50.

The robot B matrix switching means 446 generates the robot B matrix calculated by the robot B calculating means 30 when the switch 13 is set in the independent operation mode position ① and the robot A tracking operation mode position②. At the same time, the robot B matrix is also supplied to the robot B controller 60. However, when the switch 13 is set in the robot B tracking operation mode position ⓪, the robot B matrix calculated by the robot B tracking calculating means 443 is stored in the robot B matrix memory device 36 and is also supplied to the robot B controller 60.

The mode of operation will be described when the switch 13 is set in the independent operation mode position①.

The speed control means 7 calculates the maximum operating velocity in response to the signal from the volume control 14.

The operating signal output means 441 causes the robot A calculating means 20 and the robot B calculating means 30 to operate since the switch 13 is set in the independent operation mode position①.

The robot A calculating means 20 calculates the robot A matrix as the robot A position/posture instruction value in accordance with the signal from the robot A operation button 16, the maximum operating velocity calculated by the speed control means 7 and the robot A matrix read out from the robot A matrix memory device 29.

The robot A matrix switching means 445 causes the robot A matrix memory device 29 to store the robot A matrix calculated by the robot A calculating means 20 since the switch 13 is set in the independent operation mode position①. At the same time, this robot A matrix is supplied to the robot A controller 50.

The robot A controller 50 drives the robot A80 on the basis of the robot A matrix supplied from the A matrix switching means 445.

The robot B calculating means 30 calculates the robot B matrix as the robot B position/posture instruction value in accordance with the signal from the robot B operation button 17, the maximum operating velocity calculated by the speed control means 7 and the robot B matrix read out from the robot B matrix memory device 36.

The robot B matrix switching means 446 causes the robot B matrix memory device 36 to store the robot B matrix calculated by the robot B calculating means 30 since the switch 13 is set in the independent operation mode position①. At the same time, this robot B matrix is supplied to the robot B controller 60.

The robot B controller 60 drives the robot B90 on the basis of the robot B matrix supplied from the robot B matrix switching means 446.

The relative matrix calculating means 442 calculates the relative matrix representing the relative position and posture of the robots A and B in accordance with the robot A matrix calculated by the robot A calculating means 20 and the robot B matrix calculated by the robot B calculating means 30.

The relative matrix memory device 447 stores the relative matrix calculated by the relative matrix calculating means 442 since the switch 13 is set in the independent operation mode①.

The mode of operation will be described when the switch 13 is set in the robot A tracking operation mode position②.

The speed control means 7 calculates the maximum operating velocity in response to the signal from the volume control 14.

The operating signal output means 441 causes the robot B calculating means 30 to operate since the switch 13 is set in the robot A tracking operation mode position ②.

The robot B calculating means 30 calculates the robot B matrix as the robot B position/posture instruction value in accordance with the signal from the robot B operation button 17, the maximum operation velocity calculated by speed control means 7 and the robot B matrix read out from the robot B matrix memory 36.

The robot B matrix switching means 446 causes the robot B matrix memory 36 to store the robot B matrix calculated by the robot B calculating means 30 since the switch 13 is set in the robot A tracking operation mode ②. At the same time, this B matrix is supplied to the robot B controller 60.

The robot B controller 60 drives the robot B90 on the basis of the robot B matrix supplied from the robot B matrix switching means 446.

The relative matrix memory device 447 supplies the relative matrix to the robot A tracking calculation means 444 and at the same time stores it therein since the switch 13 is set in the robot A tracking operation mode①.

The robot A tracking calculating means 444 calculates the robot A matrix as the robot A position/posture instruction value in accordance with the robot B matrix calculated by the robot B calculating means 30 and the relative matrices of the robots A and B which are read out from the relative matrix memory device 447.

The robot A matrix switching means 445 causes the robot A matrix memory device 28 to store the robot A matrix calculated by the robot A tracking calculating means 444 since the switch 13 is set in the robot A tracking operation mode position ② . At the same time, this robot A matrix is supplied to the robot A controller 50.

The robot A controller 50 drives the robot A80 on the basis of the robot A matrix supplied from the robot A matrix switching means 445.

Even if the switch 13 is set in the robot B tracking mode position ⓞ the same operation pattern as in the robot A tracking mode is obtained.

In this embodiment, the robot B can track the robot A, or vice versa. Therefore, flexible teaching can be performed.

The number of tracking robots is not limited to one, but can be extended to more than 1.

Figure 8:
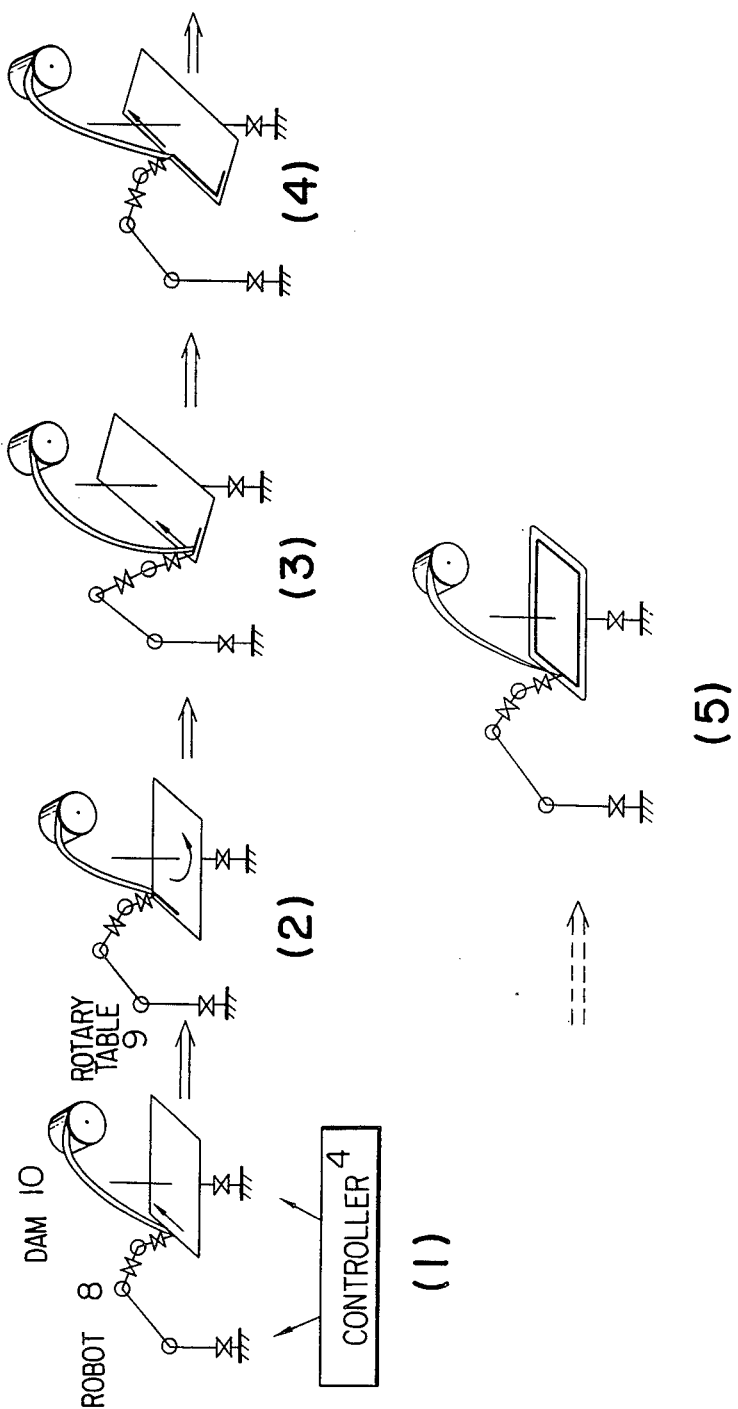
FIG. 8 is a block diagram of a tracking robot apparatus according to a fifth embodiment corresponding to the fifth aspect of the present invention.

A tracking robot apparatus according to a fifth embodiment of the present invention will be described with reference to FIG. 8. The apparatus comprises a controller for driving a rotary table 9 having a vehicle window thereon, a robot 8 for performing adhesion of a dam 19, a rotary table 9 and a robot 8.

A controller 4 comprises a memory means for storing dam adhesion procedure and work data, a control circuit for independently moving the robot 8 in accordance with predetermined work data, a control circuit for rotating the rotary table 9, and a control circuit for operating the robot 8 such that the relative position and posture of the rotary table 9 and the robot 8 are kept unchanged.

The independent operation of the robot 8 and the operation for keeping the relative position and posture of the robot 8 relative to the rotary table 9 upon rotation of the rotary table are selectively performed, thereby performing dam adhesion.

The dam adhesion procedures and the operation of the robot 8 and the rotary table 9 will be described hereinafter.

(1) The state at the beginning of dam adhesion is shown. The rotary table 9 is rotated in accordance with the stored start rotational angle and the robot 8 is operated in accordance with the stored work start data.

(1)→(2) Dam adhesion is performed by the robot 1.

(2) Dam adhesion is interrupted. When the work is continued, the window will fall outside the movable range of the robot 8. In order to prevent this, the rotary table 9 is operated.

(2)→(3) The robot 8 is operated while the rotary table 9 is rotated. The dam will not be disconnected since the relative position and posture of the robot 8 and the rotary table 9 are kept unchanged.

(3) Dam adhesion is restarted. In this state, the window falls within the movable range of the robot 8.

(3)→(4) Dam adhesion is continuously performed.

(5) By repeating the procedures, the dam adhesion around the entire edge of the window is completed.

Even if a large window is used, the robot having a narrow movable range can perform dam adhesion. In addition, when the rotary table is not used to perform directional dam adhesion, the hand of the robot is twisted through 360°. By using the rotary table, the robot hand will not be twisted.

In the system consisting of the movable device and the robot so as to perform teaching upon coordinate operation of the movable device and the robot while the workpiece is fixed on the movable device, even if the movable device having the workpiece thereon is operated, relative position and posture between the robot and the workpiece can be kept unchanged according to the present invention. Therefore, the relative position and posture of the robot and the workpiece need not be aligned, thereby shortening the teaching time. At the same time, an excessive operation is not required, and teaching precision is improved.

Since the movable device can be operated while the relative position and posture of the robot and the workpiece on the movable device are kept unchanged, interference therebetween need not be substantially considered even if the operation is complicated.

In the above description, the workpiece is fixed on the movable device for illustrative convenience. However, the present invention is not limited to this arrangement. The workpiece may be fixed on the robot.

What is claimed is:

1. A tracking robot apparatus, comprising:
   a robot for performing a predetermined operation;
   a movable device for moving an object of interest;
   a signal input device for designating operations of said robot and said movable device;
   first operating means for receiving an input signal from said signal input device and calculating an operation instruction value of said movable device;
   a first control device for driving said movable device in accordance with the operation instruction value;
   second operating means for calculating a position/posture instruction value serving as an operation instruction value of said robot based upon said operation instruction value of said movable device so as to keep the relative position and posutre of said robot and said movable device unchanged; and
   a second control device for driving said robot in response to the position/posture instruction value,
   said movable device being operated in response to the signal from said signal input device, and at the same time said robot being operated such that the relative position and posture of said robot and said movable device are kept unchanged.

2. An apparatus according to claim 1, wherein said second operating means comprises means for calculating differences between pre- and post-operation position and posture of said movable device when the position and posture of said movable device are changed, and for calculating the position/posture instruction value as the operation instruction value of said robot in accordance with the pre-operation position and posture of said robot and the differences,
   said movable device being operated in response to the signal from said signal input device, and at the same time said robot being operated such that the relative position and posture of said robot and said movable device are kept unchanged.

3. An apparatus according to claim 2, wherein said first operating means comprises a position/posture memory device for storing the pre-operation position and posture of said movable device when said movable device is moved and operation instruction value calculating means for calculating the operation instruction value in accordance with the signal from said signal input device and the pre-operation position and posture of said movable device which are stored in said position/posture memory device.

4. An apparatus according to claim 3, wherein
   said movable device comprises a rotary table,
   said movable device position/posture memory device comprises a table angle memory device for storing a table angle instruction value as an output generated from said operation instruction value calculating means and table angle retrieving means for reading out a storage content from said table angle memory device, and
   said operation instruction value calculating means comprises table velocity calculating means for calculating a rotational velocity of said rotary table in accordance with a signal which represents rotational operation of said rotary table and which is supplied from said signal input device, and table angle calculating means for calculating the table angle instruction value in accordance with a table angle signal from said table angle retrieving means and a table rotational velocity signal generated from said table velocity calculating means.

5. An apparatus according to claim 3, wherein said second operating means comprises:

movable device relative position calculating means for calculating the differences between the pre- and post-operation position and posture of said movable device in accordance with the signal which represents the pre-operation position and posture of said movable device and which is generated from said movable device position/posture memory device and with the signal representing the operation instruction value, i.e., the post-operation position and posture which is generated from said operation instruction value calculating means;

a robot position/posture memory device for storing the pre-operation position and posture of said robot; and tracking calculating means for calculating the position/posture instruction value in accordance with the signal which represents the pre-operation robot position and posture and which is retrieved from said robot position/posture memory device and the signal representing the differences generated from said movable device relative position/posture calculating means.

6. An apparatus according to claim 4, wherein said second operating means comprises:

a robot matrix memory device for storing a robot matrix signal which represents the robot position and posture and which is generated from said tracking calculating means;

robot matrix retrieving means for retrieving a storage content of said robot matrix memory device;

table relative matrix calculating means for calculating a table relative matrix representing the pre- and post-operation position and posture of said rotary table in accordance with the table angle instruction value calculated by said table angle calculating means and a pre-operation table angle retrieved by said table angle retrieving means from said table angle memory device; and tracking calculating means for calculating a robot matrix instruction value as the position/posture instruction value of said robot in accordance with the signal representing the robot matrix retrieved by said robot matrix retrieving means from said robot matrix memory device and the signal representing the table relative matrix calculated by said table relative matrix calculating means.

7. An apparatus according to claim 1, wherein said second operating means comprises operating means for calculating the position/posture instruction value as the operation instruction value of said robot by using relative position and posture of said movable device and said robot and the post-operation position and posture of said movable device, said movable device being operated in response to the signal from said signal input device, and at the same time said robot being operated such that the relative position and posture of said robot and said movable device are kept unchanged.

8. An apparatus according to claim 7, wherein said first operating means comprises a movable device position/posture memory device for storing a pre-operation position/posture of said movable device upon operation thereof, and operation instruction value calculating means for calculating the operation instruction value in accordance with the signal from said signal input device and the pre-operation position and posture which are stored in said movable device position/posture memory device; and said second operating means comprises a robot position/posture memory device for storing the pre-operation position and posture of said robot, relative position/posture calculating means for calculating the relative position and posture of said robot and said movable device in accordance with the signal which represents the pre-operation position and posture of said movable device and which is generated from said movable device position/posture memory device and the signal which represents the pre-operation position and posture of said robot and which is read out from said robot position/posture memory device, and robot position/posture calculating means for calculating the robot position/posture instruction value in accordance with the signal which represents the operation instruction value of said movable device and which is generated from said operation instruction value calculating means and the signal which represents the position and posture of said robot relative to said movable device and which is generated from said relative position/posture calculating means.

9. An apparatus according to claim 8, wherein said movable device comprises a rotary table, said movable device position/posture memory device comprises a table angle memory device for storing a table angle instruction value as an output from said operation instruction value calculating means and table angle retrieving means for retrieving out a storage content from said table angle memory device, said operation instruction value calculating means comprises table velocity calculating means for calculating a rotational velocity of said rotary table in accordance with a signal which represents rotational operation of said rotary table and which is supplied from said signal input device; and table angle calculating means for calculating the table angle instruction value in accordance with the table angle signal retrieved from said table angle retrieving means and the table rotational velocity signal generated from said table velocity calculating means, said robot position/posture memory device comprises a robot matrix memory device for storing a robot matrix signal which represents the position and posture of said robot and which is generated from said tracking calculating means, and robot matrix retrieving means for retrieving a storage content of said robot matrix memory device, said relative position/posture calculating means comprises previous table matrix calculating means for calculating the table matrix representing the position and posture of said table in accordance with the table angle retrieved from said table angle retrieving means, and relative matrix calculating means for calculating a relative matrix representing relative position and posture of said robot and said rotary table in accordance with the robot matrix retrieved by said robot matrix retrieving means from said robot matrix memory device and the table matrix signal generated from said previous table matrix calculating means, and said robot position/posture calculating means comprises table matrix calculating means for calculating a table matrix instruction value corresponding to the position and posture of said table in accordance with the table angle instruction value calculated by said table angle calculating means, and tracking calculating means for calculating a robot matrix instruction value as the position/posture instruction value of said robot in accordance with the table matrix instruction value calculated by said table matrix calculating means and the relative matrix which represents the relative position and posture of said rotary table and said robot and which is calculated by said relative matrix calculating means.

10. An apparatus according to claim 7, wherein said second operating means has means for always calculating and storing a relative matrix representing the relative position and posture of said movable device and said robot.

11. An apparatus according to claim 1, further comprising: third operating means, in addition to said second operating means for calculating the position/posture instruction value as the robot operation instruction value, for calculating a position/posture instruction value for operating said robot independently of said movable device in response to the input signal from said signal input device; and switching means for selecting one of said second and third operating means.

12. An apparatus according to claim 11, wherein said apparatus has means for calculating and storing a relative matrix representing the relative position and posture of said movable device and said robot.

13. An apparatus according to claim 11, wherein said switching means comprises: a switch, arranged in said signal input device, for generating a signal representing one of an independent operation mode for independently operating said robot and said movable device and a tracking operation mode for causing said robot to track said movable device; operating signal output means for generating an operating signal to determine in response to a signal from said switch whether said second or third operating means is operated; and robot position/posture instruction value switching means for supplying one of outputs from said second and third operating means to said second control device in response to the signal from said switch.

14. An apparatus according to claim 13, wherein said third operating means comprises:
positional velocity calculating means for calculating a positional velocity of said robot in accordance with signals which represent movement and a maximum operating velocity of said robot and which are supplied from said signal input device;
rotational velocity calculating means for calculating a robot rotational velocity in accordance with signals which represent rotational operation and the maximum operating velocity of said robot and which are supplied from said input device;
separating means for separating the pre-operation position/posture signal of said robot read out from said robot position/posture memory device into a robot position component and a robot posture component;
position calculating means for calculating a robot position component instruction value in accordance with the robot position component generated from said separating means and the robot positional velocity generated from said positional velocity calculating means;
posture calculating means for calculating a robot posture component instruction value in accordance with the robot posture component generated from said separating means and the robot rotational velocity generated from said rotational velocity calculating means; and
combining means for combining the position/posture instruction value of said robot in accordance with the robot position component instruction value calculated by said position calculating means and the robot posture component instruction value calculated by said posture calculating means,
said positional velocity calculating means and said rotational velocity calculating means being controlled to be operative or inoperative in response to an output from said operating signal output means.

15. An apparatus according to claim 14, wherein said second calculating means comprises
table matrix calculating means for calculating a table matrix instruction value corresponding to the position and posture of said table in accordance with the table angle instruction value calculated by said table angle calculating means,
relative matrix calculating means for calculating a relative matrix as the relative position and posture of said robot and said rotary table in accordance with the robot matrix instruction value as the robot position/posture instruction value generated from said third operating means and the table matrix instruction value generated from said table matrix calculating means,
a relative matrix memory device for storing the relative matrix of said robot and said rotary table,
relative matrix retrieving means for retrieving the relative matrix from said relative matrix memory device, and
tracking operating means for calculating a robot matrix instruction value as the robot position/posture instruction value in accordance with the table matrix instruction value generated from said table matrix calculating means and the relative matrix retrieved by said relative matrix retrieving means from said relative matrix memory device; and
said switching means comprises
table matrix switching means for supplying the output from said table matrix calculating means to said relative matrix calculating means in the independent operation mode and to said tracking calculating means in the tracking operation mode in response to the signal from said switch, and
relative matrix switching means for supplying an output from said relative matrix calculating means to said relative matrix memory device in the independent operation mode and an output from said relative matrix retrieving means to said relative matrix memory device in the tracking operation mode in response to the output from said switch.

16. An apparatus according to claim 1, wherein said movable device comprises a robot.

17. A tracking robot apparatus comprising:

first and second robots for performing a predetermined operation and/or moving an object of interest;

a signal input device for designating operations of said first and second robots;

first robot calculating means for calculating an operation instruction value of said first robot in accordance with an input signal from said signal input device;

second robot calculating means for calculating an operation instruction value of said second robot in accordance with the input signal from said signal input device;

tracking calculating means for calculating an operation instruction value such that relative position and posture of said first and second robots are kept unchanged in response to an operation of one of said first and second robots in accordance with outputs from said first and second robot calculating means;

a first controller for driving said first robot in accordance with the operation instruction value generated from one of said first robot calculating means and said tracking calculating means; and a second controller for driving said second robot in response to the operation instruction value generated from one of said second robot calculating means and said tracking calculating means.

18. An apparatus according to claim 17, wherein there are provided an independent operation mode for independently operating said first and second robots and a tracking operation mode for tracking one of the first and second robots such that the relative position and posture thereof are kept unchanged.

19. An apparatus according to claim 18, comprising robot operation instruction value switching means connected to at least one of said first and second controllers, said robot operation instruction value switching means being arranged to select an output from said first or second robot calculating means when the independent operation mode is set and to select an output from said tracking calculating means when the tracking operation mode is set in response to an operation mode instruction signal from said signal input means.

20. An apparatus according to claim 18, wherein said tracking calculating means comprises:

relative position/posture calculating means for calculating relative position and posture of said first and second robots in accordance with a first robot operation instruction value calculated by said first robot calculating means and a second robot operation instruction value calculated by said second robot calculating means in the independent operation mode;

memory device for storing the relative position and posture which are calculated by said relative position/posture calculating means; and at least one robot tracking calculating means for calculating a robot position/posture signal for instructing tracking in accordance with the operation instruction value calculated by one of said first and second robot calculating means and the relative position and posture which are retrieved from said memory device in the tracking operation mode.

21. An apparatus according to claim 17, wherein a plurality of robots are used to track another robot such that the relative position and posture thereof are kept unchanged.

22. An apparatus according to claim 1, wherein said movable device comprises a slide table which is linearly driven.

* * * * *

UNITED STATES PATENT AND TRADEMARK OFFICE
CERTIFICATE OF CORRECTION

PATENT NO. : 4,712,183

DATED : December 8, 1987

INVENTOR(S) : Shiroshita et al.

It is certified that error appears in the above—identified patent and that said Letters Patent is hereby corrected as shown below:

Change the addresses of the assignees from "Tokyo, Japan" to --Aichi-Ken, Japan--.

Signed and Sealed this

Eighteenth Day of April, 1989

Attest:

DONALD J. QUIGG

Attesting Officer

Commissioner of Patents and Trademarks